United States Patent
Inoue et al.

(10) Patent No.: US 11,869,280 B2
(45) Date of Patent: Jan. 9, 2024

(54) INFORMATION PROVIDING METHOD AND INFORMATION PROVIDING SYSTEM

(71) Applicant: PANASONIC INTELLECTUAL PROPERTY MANAGEMENT CO., LTD., Osaka (JP)

(72) Inventors: Kazunori Inoue, Tokyo (JP); Tomoaki Abe, Kanagawa (JP); Hiroshi Uranaka, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 17/392,596

(22) Filed: Aug. 3, 2021

(65) Prior Publication Data

US 2022/0044496 A1    Feb. 10, 2022

(30) Foreign Application Priority Data

Aug. 5, 2020   (JP) .................................. 2020-133362
May 14, 2021  (JP) .................................. 2021-082715

(51) Int. Cl.
*G07C 5/00*   (2006.01)
*G01S 19/42*  (2010.01)
(Continued)

(52) U.S. Cl.
CPC .............. *G07C 5/008* (2013.01); *G01S 19/42* (2013.01); *G01S 19/52* (2013.01); *G07C 5/0841* (2013.01); *H04W 4/027* (2013.01); *H04W 4/44* (2018.02)

(58) Field of Classification Search
CPC ....... G07C 5/008; G07C 5/0841; G01S 19/42; G01S 19/52; G01S 19/396; H04W 4/027; H04W 4/44

(Continued)

(56) References Cited

U.S. PATENT DOCUMENTS

2009/0072997 A1*  3/2009  Shrum, Jr. ............. G08G 1/127
                                                                340/905
2015/0006132 A1   1/2015  Matsumura
(Continued)

FOREIGN PATENT DOCUMENTS

| JP | 2012-247854 | 12/2012 |
| JP | 2013-149154 | 8/2013 |
| JP | 2017-506782 | 3/2017 |

*Primary Examiner* — Tyler D Paige

(74) *Attorney, Agent, or Firm* — Greenblum & Bernstein, P.L.C.

(57) ABSTRACT

An information providing method is performed in an information providing system. The information providing method includes: acquiring pieces of speed information of a vehicle in association with identification information of an in-vehicle device from the in-vehicle device via roadside antennas, each of the pieces of speed information having been stored in the in-vehicle device each time the vehicle moves a prescribed distance before the vehicle passes by the roadside antennas; and causing an information display device to display evaluation information in association with the identification information, the evaluation information indicating a frequency of occurrence of sudden acceleration or deceleration events of the vehicle obtained from a proportion of differences between calculation values outside a threshold range, the calculation values being calculated on the basis of the pieces of speed information in a prescribed period corresponding to the pieces of speed information stored in the in-vehicle device.

13 Claims, 15 Drawing Sheets

(51) Int. Cl.
*G01S 19/52* (2010.01)
*G07C 5/08* (2006.01)
*H04W 4/02* (2018.01)
*H04W 4/44* (2018.01)

(58) Field of Classification Search
USPC .......................................................... 701/119
See application file for complete search history.

(56) References Cited

U.S. PATENT DOCUMENTS

| | | | |
|---|---|---|---|
| 2015/0033174 A1* | 1/2015 | Hisatsugu | B60K 35/00 715/771 |
| 2017/0110021 A1 | 4/2017 | Skagius et al. | |
| 2022/0051340 A1* | 2/2022 | Rose | G07C 5/0808 |

* cited by examiner

INFORMATION PROVIDING METHOD AND INFORMATION PROVIDING SYSTEM

FIELD

The present disclosure relates to an information providing method and an information providing system.

BACKGROUND

JP-A-2012-247854 discloses a driving evaluation system which evaluates the manner of driving of a driver of a vehicle on the basis of pieces of driving behavior data for determination of driving behavior of the vehicle. The pieces of driving behavior data have been collected in time series at a prescribed cycle from the vehicle that is traveling. The driving evaluation system determines driving behavior of the vehicle on the basis of collected pieces of driving behavior data, extracts evaluation target data from driving behavior data relating to the determined driving behavior, and records evaluation target data of a plurality of drivers including the evaluation target driver. The driving evaluation system calculates statistical data of the recorded evaluation target data of the plurality of drivers and evaluates the manner of driving of the evaluation target driver on the basis of a relationship between the evaluation target data of the drivers and the statistical data according to prescribed evaluation rules.

SUMMARY

The driving evaluation system disclosed in JP-A-2012-247854 assumes that the manner of driving of a driver is evaluated using values obtained by sampling angular velocity data and acceleration data of a vehicle and GPS data at the frequency of 1 Hz. Now assume a case of evaluating the manner of driving of a driver of a vehicle that uses ETC (Electronic Toll Collection) 2.0 (registered trademark) to perform a wireless communication with roadside devices such as ITS (Intelligent Transport Systems) spots (registered trademark) installed every prescribed distance. In this case, the vehicle accumulates driving behavior data for driving evaluation of the driver in a temporally irregular manner and transmits the accumulated driving behavior data together when the vehicle comes close to one of the roadside device. Thus, where as in this case pieces of driving behavior data of a vehicle are collected in a temporally irregular manner, it is difficult to evaluate the manner of driving of the driver of the vehicle even if the technique of JP-A-2012-247854 is used.

The present disclosure has been made in view of the above circumstances, and an object thereof is to provide an information providing method and an information providing system capable of evaluating a driving tendency of a driver of a vehicle even if pieces of data indicating driving behavior of the vehicle are acquired in a temporally irregular manner.

The present disclosure provides an information providing method in an information providing system configured to communicate with an in-vehicle device installed in a vehicle via roadside antennas, the information providing method including: acquiring pieces of speed information of the vehicle in association with identification information of the in-vehicle device from the in-vehicle device via the roadside antennas, each of the pieces of speed information having been stored in the in-vehicle device each time the vehicle moves a prescribed distance before the vehicle passes by the roadside antennas; and causing an information display device to display evaluation information in association with the identification information, the evaluation information indicating a frequency of occurrence of sudden acceleration events or sudden deceleration events of the vehicle, the frequency of occurrence being obtained from a proportion of differences between calculation values outside a threshold range, the calculation values being calculated on the basis of the pieces of speed information in a prescribed period corresponding to the pieces of speed information stored in the in-vehicle device.

The present disclosure provides an information providing system configured to communicate with an in-vehicle device installed in a vehicle via roadside antennas and communicate with a device installed in the vehicle via a network, and configured to store, in a storage, pieces of speed information of the vehicle in association with identification information of the in-vehicle device received from the in-vehicle device via the roadside antennas, each of the pieces of speed information having been stored in the in-vehicle device each time the vehicle moves a prescribed distance before the vehicle passes by the roadside antennas, the information providing system including: one or more processors; and one or more memories having instructions, when executed by the one or more processors, to cause the information providing system to perform operations, the operations including: retrieving the pieces of speed information of the vehicle in association with the identification information from the storage; and transmitting evaluation information to the device via the network to cause the device to display the evaluation information, the evaluation information indicating a frequency of occurrence of sudden acceleration events or sudden deceleration events of the vehicle, the frequency of occurrence being obtained from a proportion of differences between calculation values outside a threshold range, the calculation values being calculated on the basis of the pieces of speed information in a prescribed period corresponding to the pieces of speed information stored in the in-vehicle device.

The present disclosure provides an information providing system configured to communicate with an in-vehicle device installed in a vehicle via roadside antennas, the information providing system including: one or more processors; and one or more memories having instructions, when executed by the one or more processors, to cause the information providing system to perform operations, the operations including: the pieces of speed information of the vehicle in association with the identification information from the storage; and causing an information display device to display evaluation information in association with the identification information, the evaluation information indicating a frequency of occurrence of sudden acceleration events or sudden deceleration events of the vehicle, the frequency of occurrence being obtained from a proportion of differences between calculation values outside a threshold range, the calculation values being calculated on the basis of the pieces of speed information in a prescribed period corresponding to the pieces of speed information stored in the in-vehicle device.

DETAILED DESCRIPTION

Each embodiment as a specific disclosure of an information providing method and an information providing system according to the disclosure will be hereinafter described in detail while referring to the accompanying drawings when necessary. However, unnecessarily detailed descriptions may be avoided. For example, detailed descriptions of well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure thoroughly and are not intended to restrict the subject matter set forth in the claims.

Embodiment 1

Figure 1:
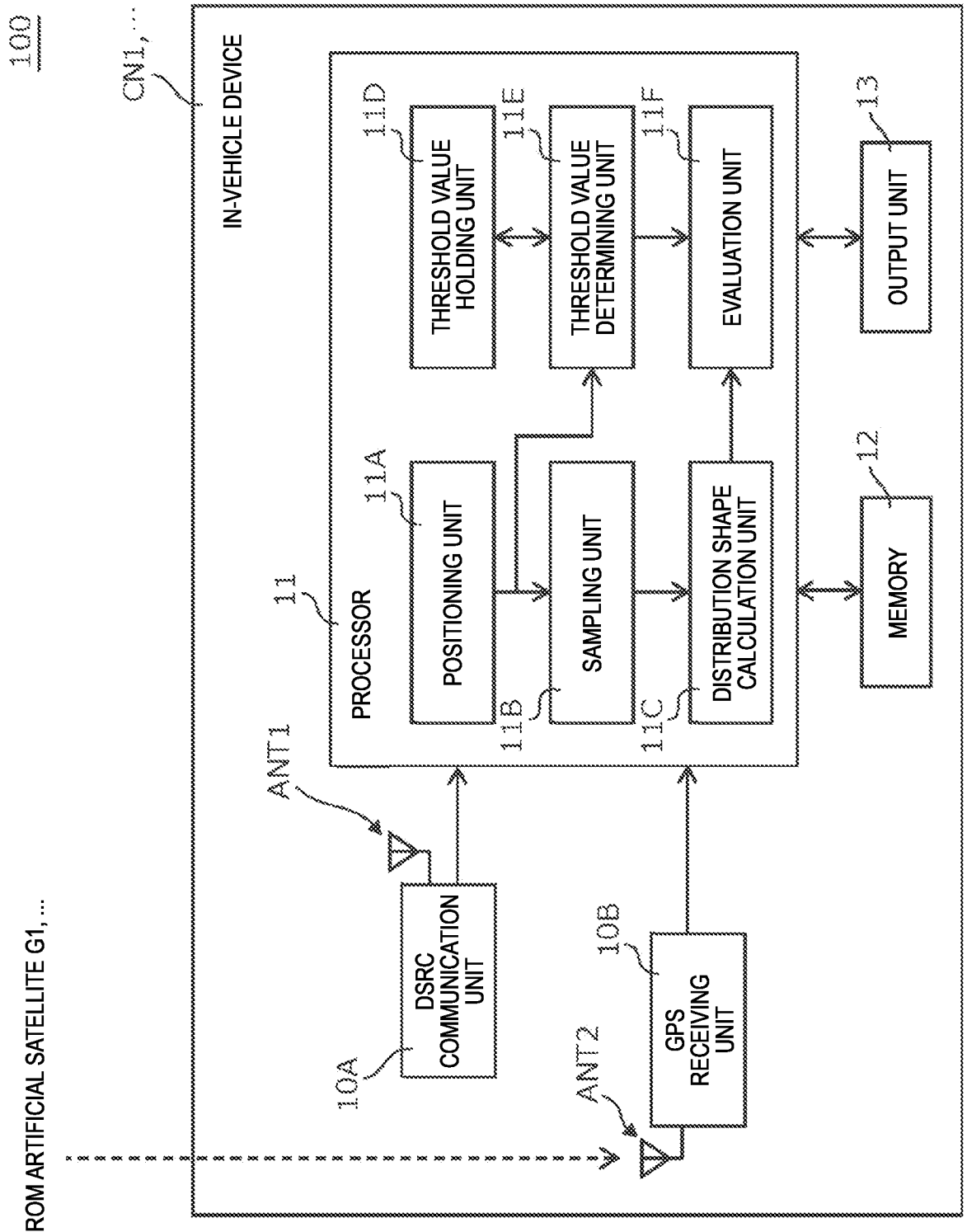
FIG. 1 is a block diagram showing an example internal configuration of an in-vehicle device according to a first embodiment.

FIG. 1 is a block diagram showing an example internal configuration of an in-vehicle device CN1 according to a first embodiment. The in-vehicle device CN1 as an example driving evaluation device 100 according to the first embodiment is a device capable of evaluating the manner of driving of each driver who drives a vehicle. Although FIG. 1 shows a case of a plurality of vehicles, only one vehicle may be employed. Since a plurality of vehicles are similar in configuration and a plurality of in-vehicle devices CN1, . . . are the same in configuration, the following description will be directed to the vehicle and the in-vehicle device CN1.

The in-vehicle device CN1 is installed in the vehicle. Capable of receiving satellite positioning signals transmitted from respective artificial satellites G1, . . . , the in-vehicle device CN1 acquires current position information and speed information of the vehicle on the basis of received satellite positioning signals.

The in-vehicle device CN1 is configured so as to include a GPS receiving unit 10B, a processor 11, and a memory 12, and an output unit 13. A DSRC communication unit 10A will not be described here because it is not indispensable for the configuration of the in-vehicle device CN1 that is the driving evaluation device 100 according to the first embodiment and it is included in an in-vehicle device CN1A of a drive evaluation system 200 according to a second embodiment.

The GPS receiving unit 10B receives, by a GPS antenna ANT2, satellite positioning signals transmitted from the respective artificial satellites G1, . . . . The GPS receiving unit 10B calculates position information (more specifically, latitude/longitude information) indicating a position of the vehicle and speed information of the vehicle on the basis of the received satellite positioning signals and outputs the generated position information and speed information to a positioning unit 11A of the processor 11 in such a manner that they are associated with date/time information indicating a date and time of reception of the satellite positioning signals. Alternatively, the positioning unit 11A may calculate position information and speed information on the basis of satellite positioning signals. In this case, the GPS receiving unit 10B outputs received satellite positioning signals to the positioning unit 11A. The GPS antenna ANT2 may be included in the processor 11 (described later). Furthermore, the manner of installation of the GPS antenna ANT2 is not limited to the case that it is provided as an integrated component of the in-vehicle device CN1 and may be installed in a car navigation system (not shown) that is connected to the in-vehicle device CN1 so as to be capable of data communication with it. In this case, in-vehicle device CN1 may acquire position information and speed information of the vehicle in the form of satellite positioning signals or positioning information transmitted from the navigation system.

The processor 11 is configured using, for example, a CPU (central processing unit) or an FPGA (field-programmable gate array) and performs various kinds of processing and control in cooperation with the memory 12. More specifically, the processor 11 realizes functions of the respective units by referring to programs and data held by the memory 12 and running the programs. For example, these units are the positioning unit 11A, a sampling unit 11B, a distribution shape calculation unit 11C, a threshold value holding unit 11D, a threshold value determining unit 11E, and an evaluation unit 11F. The processor 11 evaluates the manner of driving of a driver of the in-vehicle device CN1 using these units.

The positioning unit 11A acquires current position information and speed information of the vehicle that are output from the GPS receiving unit 10B and outputs those pieces of information to the sampling unit 11B. Where the GPS receiving unit 10B outputs satellite positioning signals, the positioning unit 11A calculates current position information and speed information of the vehicle on the basis of these satellite positioning signals and outputs the calculated current position information and speed information to the sampling unit 11B.

The sampling unit 11B acquires the current position information and speed information of the vehicle that are output from the positioning unit 11A. The sampling unit 11B detects whether the vehicle has moved a first prescribed distance (e.g., 100 m, 150 m, 200 m) or more from a position indicated by position information received when it performed sampling processing last time, on the basis of the acquired current position information of the vehicle. If detecting that the vehicle has moved the first prescribed distance or more, the sampling unit 11B samples the speed information acquired at the time of this detection and outputs the sampled speed information to the distribution shape calculation unit 11C to store the sampled speed information in the distribution shape calculation unit 11C.

The distribution shape calculation unit 11C, which is an example of the terms "acquisition unit" and a "deriving unit," accumulates a plurality of sampled pieces of speed information that are output from the sampling unit 11B and judges whether sampled pieces of speed information corresponding to a second prescribed distance (e.g., 30 km or 40 km) have been accumulated on the basis of pieces of position information indicating positions where the accumulated respective sampled pieces of speed information were acquired. If judging that sampled pieces of speed information corresponding to the second prescribed distance have been accumulated on the basis of the pieces of position information indicating the positions where the respective sampled and accumulated pieces of speed information were acquired, the distribution shape calculation unit 11C calculates a difference value between each set of two pieces of speed information adjacent to each other in a time series among the sampled and accumulated pieces of speed information. More specifically, if stored with, for example, 150 sampled pieces of speed information, the distribution shape calculation unit 11C calculates a speed difference (hereinafter referred to as a "difference value") between a speed indicated by speed information sampled by kth sampling (k: an integer that is larger than or equal to 1) and a speed indicated by speed information sampled by (k+1)th sampling that is adjacent to the kth sampling in time-series. On the other hand, if judging that sampled pieces of speed information corresponding to the second prescribed distance have not been accumulated yet on the basis of the pieces of position information indicating the positions where the respective sampled and accumulated pieces of speed information were acquired, the distribution shape calculation unit 11C performs the above-described sampling processing and accumulation processing on pieces of speed information. If speed information sampled by the kth sampling is speed information of the latest sampling, the distribution shape calculation unit 11C may calculate a speed difference between a speed indicated by the speed information sampled by the kth sampling and a speed indicated by speed information sampled by (k−1)th sampling. In this case, k is an integer that is larger than or equal to 2.

The distribution shape calculation unit 11C classifies each of a plurality of calculated difference values (data) into one of a plurality of groups of different, prescribed speed ranges (e.g., 0-5 km/h, 5-10 km/h, . . . ). The prescribed ranges of the plurality of groups are set in units of a prescribed value (e.g., 2 km/h, 3 km/h, or 5 km/h). The distribution shape calculation unit 11C determines the count of each group so that the count indicates the number of difference values (data) belonging to the group, on the basis of a result of the grouping. The distribution shape calculation unit 11C initializes the counts of the respective groups to 0 at a prescribed date and time. If the distribution shape calculation unit 11C is stored with information of the numbers of sets of difference values (data) belonging to the respective groups that were counted when grouping was done last time, the distribution shape calculation unit 11C adds the numbers of sets of difference values (data) belonging to the respective groups in the grouping of this time to the numbers of difference values (data) that were accumulated last time as belonging to the respective groups.

After counting the number of difference values (data) belonging to each group, the distribution shape calculation unit 11C judges whether difference values (data) corresponding to the preset second prescribed distance have been counted. If judging that difference values (data) corresponding to the preset second prescribed distance have been counted, the distribution shape calculation unit 11C calculates a proportion of difference values (data) belonging to each group with respect to all the difference values (data) and generates a speed variation distribution including pieces of information of proportions of sets of difference values (data) belonging to the respective groups. On the other hand, if judging that difference values (data) corresponding to the preset second prescribed distance have not been counted, the distribution shape calculation unit 11C performs processing of calculating difference values. The distribution shape calculation unit 11C outputs the generated speed variation distribution to the evaluation unit 11F.

A plurality of parameter values (e.g., acceleration values) to be used for calculating threshold values for evaluation of the manner of driving of the driver of the vehicle are stored in the threshold value holding unit 11D according to position information of the vehicle acquired from satellite positioning signals, date/time information, or the like (hereinafter referred to as "parameter value selection information"). The term "threshold values" as used herein means a first threshold value for judgment (detection) of sudden acceleration of the vehicle, a second threshold value for judgment (detection) of sudden deceleration of the vehicle, etc.

The threshold value determining unit 11E selects at least one (e.g., acceleration value) of the plurality of parameter values stored in the threshold value holding unit 11D according to the parameter value selection information. The threshold value determining unit 11E calculates a threshold value on the basis of each selected parameter value and outputs the calculated threshold values to the evaluation unit 11F. The threshold value determining unit 11E may be stored with threshold values to be used for evaluation of the manner of driving of the driver of the vehicle. In this case, the threshold value determining unit 11E outputs the stored threshold values to the evaluation unit 11F without performing the above-mentioned parameter value selection processing and processing of calculating threshold values.

The threshold value determining unit 11E may calculate a third threshold value to be used for excluding difference values (hereinafter referred to as "abnormal values") having abnormal values from the plurality of difference values to be used for generation of a speed variation distribution. The term "abnormal values" as used herein means difference value calculation results that exhibit abnormal values due to erroneous position information and/or speed information of the vehicle calculated on the basis of satellite positioning signals. Abnormal values are calculated when, for example, erroneous position information and/or speed information including errors are calculated on the basis of, for example, satellite positioning signals that are received in a state that sufficiently high positioning accuracy cannot be obtained due to an improper arrangement of the artificial satellites G1, . . . or a dead angle or satellite positioning signals in which times from their transmission to reception are incorrect due to a multipath problem. When having calculated a third threshold value on the basis of the selected parameter values, the threshold value determining unit 11E outputs the calculated third threshold value to the evaluation unit 11F.

The evaluation unit 11F which is an example of the term "output unit" can generate, on the basis of the third threshold value that is output from the threshold value determining unit 11E, a speed variation distribution in which difference values having absolute values that are larger than or equal to the third threshold value are excluded from the difference values belonging to each group. If judging that difference values corresponding to the second prescribed distance have not been counted because of the exclusion of the difference values having absolute values that are larger than or equal to the third threshold value from the difference values belonging to each group, the evaluation unit 11F may cause the sampling unit 11B to perform sampling processing until difference values corresponding to the second prescribed distance are counted and cause the distribution shape calculation unit 11C to perform processing of calculating difference values.

The evaluation unit 11F calculates a first output value indicating a proportion of sudden acceleration events and a second output value indicating a proportion of sudden deceleration events on the basis of the speed variation distribution that is output from the distribution shape calculation unit 11C and the threshold values that are output from the threshold value determining unit 11E. If a third threshold value is output from the threshold value determining unit 11E, the evaluation unit 11F generates a speed variation distribution by excluding abnormal values having absolute values that are larger than or equal to the third threshold value (that is, the group of values having absolute values larger than or equal to the third threshold value). The evaluation unit 11F evaluates the manner of driving of the driver of the vehicle, and outputs a driving evaluation result to the output unit 13 and stores it in the memory 12. The threshold value for determining abnormal values (i.e., the third threshold value) may have different absolute values for a positive threshold value (an upper limit of a range determined to be normal) and a negative threshold value (a lower limit of a range determined to be normal).

The evaluation unit 11F judges which of "frequent sudden acceleration and sudden deceleration" (hereinafter referred to as sudden acceleration/deceleration), "frequent sudden acceleration" (hereinafter referred to as sudden acceleration), and "frequent sudden deceleration" (hereinafter referred to as sudden deceleration) the manner of driving of the driver is categorized as on the basis of the calculated first output value and second output value, a threshold value (evaluation reference value) for a first output value and a threshold value (evaluation reference value) for a second output value. For example, the evaluation unit 11F judges that the driving evaluation result should be "sudden acceleration/deceleration" if judging that the first output value and the second output value are both larger than or equal to 3.0%, "sudden acceleration" if judging that the first output value is larger than or equal to 3.0% and the second output value is smaller than 3.0%, and "sudden deceleration" if judging that the first output value is smaller than 3.0% and the second output value is larger than or equal to 3.0%.

It goes without saying that the threshold value 3.0% for each of a first output value and a second output value to be used for judging whether the manner of driving of the driver should be classified as "sudden acceleration/deceleration," "sudden acceleration," or "sudden deceleration" is just an example and the invention is not limited to it. The threshold value (evaluation reference value) for each of a first output value and a second output value may be another value (e.g., 2.0%, 5.0%, or 10%) and the threshold value (evaluation reference value) for a first output value and the threshold value (evaluation reference value) for a second output value may be set at different values (e.g., the threshold value for a first output value is 3.0% and the threshold value for a second output value is 2.0%). Furthermore, the driving evaluation method of the evaluation unit 11F is not limited to the above example; for example, whether the manner of driving of the driver should be classified as "sudden acceleration/deceleration," "sudden acceleration," or "sudden deceleration" may be judged on the basis of a difference between the first output value and the second output value.

Furthermore, an evaluation method employed by the evaluation unit 11F may be selected according to parameter value selection information (i.e., latitude/longitude information of a road on which the vehicle is traveling, date/time information, etc.). For example, if judging that the latitude is high and it is currently winter and nighttime on the basis of acquired latitude/longitude information and date/time information, the evaluation unit 11F may set the threshold value for a first output value larger than the threshold value for a second output value.

For example, the memory 12 includes a RAM (random access memory) as a work memory to be used while the processor 11 performs each kind of processing and a ROM (random access memory) that is stored with programs that prescribe how the processor 11 is to operate as well as necessary data. Data or information generated or acquired by the processor 11 is stored in the RAM temporarily. Programs for prescribing operation of the processor 11 is stored in the ROM. The memory 12 is also stored with identification information of the in-vehicle device CN1.

The output unit 13, which includes, for example, an LED (light-emitting diode; not shown), a speaker (not shown), etc., outputs, in the form of light having a certain color or a sound, a driving evaluation result that is output from the evaluation unit 11F. The output unit 13 may be equipped with an LCD (liquid crystal display) and output, on it, notification information to notify the driver of a driving evaluation result that is output from the evaluation unit 11F and indicates that sudden acceleration and sudden deceleration are both done frequently, sudden acceleration is done frequently, or sudden deceleration is done frequently. Furthermore, where, for example, the in-vehicle device CN1 is connected to a car navigation device (not shown) in such a manner that data communication can be performed with it, the in-vehicle device CN1 may output a driving evaluation result to the car navigation device as notification information so that it is output through a monitor (not shown) or a speaker (not shown) of the car navigation device.

Each of the plurality of artificial satellites G1, . . . transmits a satellite positioning signal to the vehicle on the ground. The plurality of artificial satellites G1, . . . are artificial satellites capable of providing a global satellite positioning service of GPS (Global Positioning System) of the U.S., GLONASS (Global Navigation Satellite System) of Russia, Galileo of Europe, or the like or artificial satellites capable of providing an area-restricted satellite positioning service of the semi-zenith satellite system of Japan.

Figure 2:
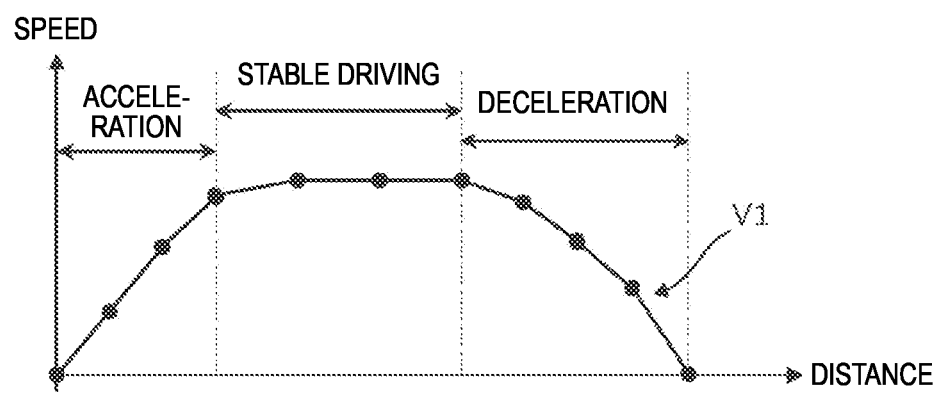
FIG. 2 illustrates how sampling processing and speed difference calculation processing are performed.
Figure 2:
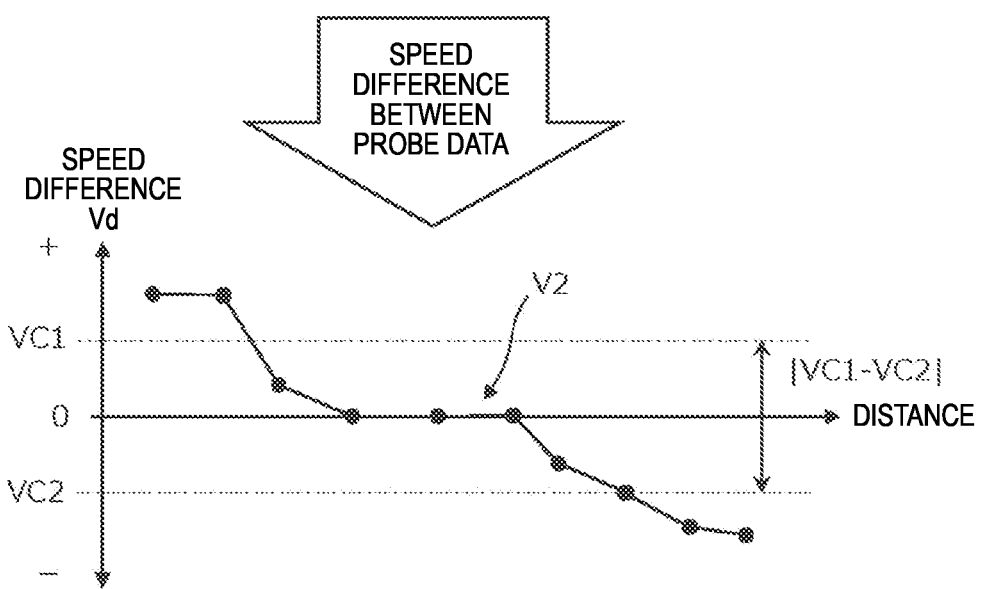

Sampling processing and speed difference calculation processing will be described with reference to FIG. 2. FIG. 2 illustrates how sampling processing and speed difference calculation processing are performed.

A graph V1 in which the vertical axis represents the speed and the horizontal axis represents the movement distance of the vehicle shows pieces of speed information (i.e., probe data) obtained by performing sampling by the sampling unit 11B, every first prescribed distance, on a plurality of pieces of speed information of the vehicle from among the position information and the speed information calculated on the basis of a plurality of satellite positioning signals received by the GPS receiving unit 10B.

A graph V2 in which the vertical axis represents the speed difference (i.e., difference value) Vd and the horizontal axis represents the movement distance of the vehicle shows difference values each being a difference value between two adjacent ones of the plurality of sampled pieces of speed information sampled every first prescribed distance that are shown in the graph V1. A first threshold value VC1 is a threshold value indicating sudden acceleration of the vehicle and a second threshold value VC2 is a threshold value indicating sudden deceleration of the vehicle. In a range |VC1−VC2| between the first threshold value VC1 and the second threshold value VC2, the vehicle is driven stably without making sudden acceleration or sudden deceleration.

Figure 3:
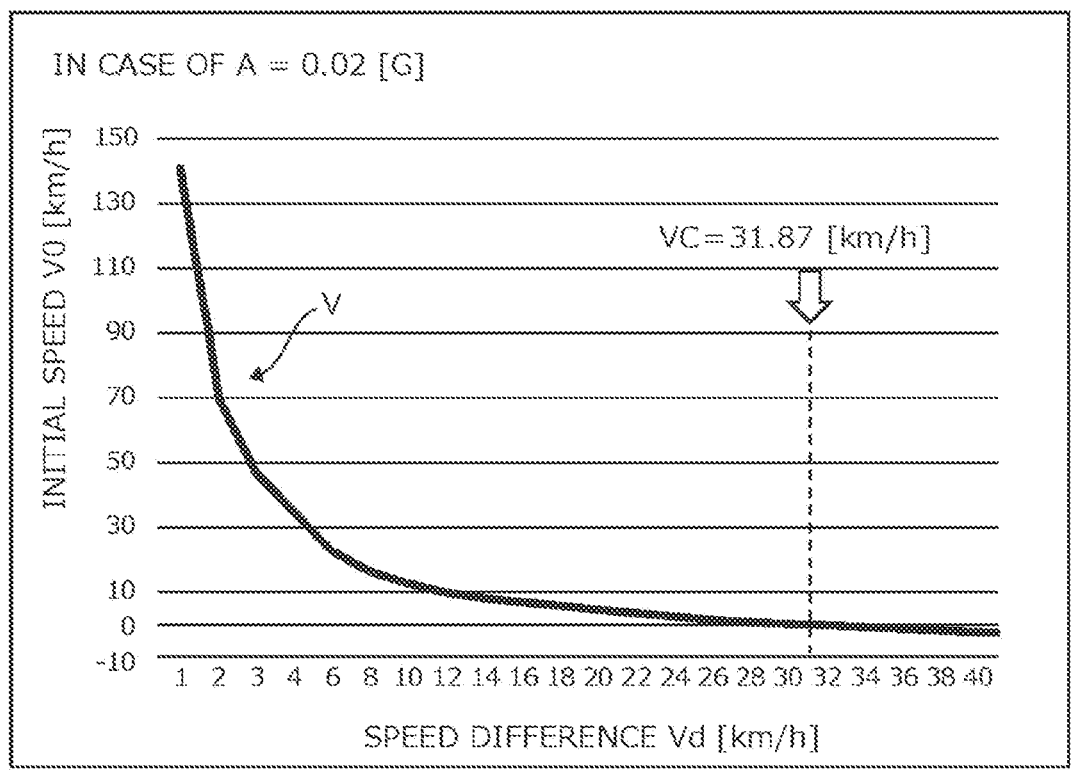
FIG. 3 is a graph illustrating an example method for calculating a threshold value.

Next, a method for calculating a threshold value will be described with reference to FIG. 3. FIG. 3 is a graph illustrating an example method for calculating a threshold value VC. FIG. 3 shows an example of calculation in which the threshold value determining unit 11E selects acceleration A=0.02 G at which the vehicle can be driven on a road stably as a parameter value for calculating a threshold value VC. FIG. 3 illustrates an example manner of calculation in which the sampling unit 11B performs sampling approximately every 200 m ((first prescribed distance)=200 m).

A graph V shown in FIG. 3 indicates a relationship between an initial speed V0 as speed information that is sampled kth and a speed difference Vd that is a difference value between the initial speed V0 and speed information sampled (k+1)th in a case that the vehicle is driven at constant acceleration A=0.02 G and sampling is done every distance D=0.2 km. The initial speed V0 is calculated according to the following Equation (1):

(Equation (1))

$$V0 = \frac{AD}{Vd} - \frac{Vd}{2} \quad (1)$$

The speed difference Vd in Equation (1) is calculated by multiplying the acceleration A=0.02 G by a time difference between a time of acquisition of the speed information sampled kth and a time of acquisition of the speed information sampled (k+1)th.

As shown in FIG. 3, since the initial speed V0 is a positive value, the upper limit of the speed difference Vd in a case that the vehicle is accelerating at the acceleration A=0.02 G at which the vehicle can be driven stably is calculated to be 31.87 km/h that occurs when the initial speed V0 is equal to 0 km/h. Thus, the threshold value determining unit 11E calculates that with the acceleration A=0.02 G that is considered to provide a stable driving the speed difference that occurs each time the vehicle travels a distance 200 m should be in the range from 0 km/h to about 30 km/h. Likewise, the threshold value determining unit 11E calculates that with acceleration A=−0.02 G (deceleration) that is considered to provide a stable driving the speed difference that occurs each time the vehicle travels a distance 200 m should be in the range from about −30 km/h to 0 km/h. In this manner, the threshold value determining unit 11E calculates on the basis of the calculated speed difference ±30 km/h that the first threshold value VC1 to be used for judgment about sudden acceleration is 30 km/h and the second threshold value VC2 to be used for judgment about sudden deceleration is −30 km/h.

The threshold value determining unit 11E employed in the first embodiment calculates the first threshold value VC1 and the second threshold value VC2 in the above-described manner. An absolute value of the speed difference Vd for judgment "stable driving" increases as the absolute value of the acceleration A becomes larger and decreases as the absolute value of the acceleration A becomes smaller. Thus, the first threshold value and the second threshold value are set at such values that a judgment "acceleration" or "deceleration" is made less likely as the absolute value of the acceleration A as a parameter value becomes larger and at such values that a judgment "acceleration" or "deceleration" is made more likely as the absolute value of the acceleration A becomes smaller. Likewise, the third threshold value is set at a larger value as the absolute value of the acceleration A becomes larger and at a smaller value as the absolute value of the acceleration A becomes smaller.

The above-described threshold value calculation method is just an example and the invention is not limited to it. For example, the absolute value of acceleration to be used for calculation of a first threshold value and the absolute value of acceleration to be used for calculation of a second threshold value may be made different from each other on the basis of latitude/longitude information (parameter value selection information; e.g., whether the vehicle is in the southern hemisphere or the northern hemisphere) included in position information, date/time information (parameter value selection information; e.g., whether it is winter or it is night or early morning), or the like. Furthermore, although FIG. 3 is directed to the case that the first threshold value and the second threshold value are set so as to have the same absolute value, they may be set so as to have different absolute values.

Next, a description will be made of example speed variation distributions generated by the distribution shape calculation unit 11C. Although FIGS. 4-7 show histograms as example speed variation distributions, the speed variation distribution is not limited to a histogram. Although in the examples of FIGS. 4-7 the evaluation unit 11F calculates a proportion of the number of pieces of data belonging to a group of a speed difference Vd=0 km/h as a proportion of stable driving, the evaluation unit 11F may calculate a proportion of the number of pieces of data belonging to a group of a speed difference range |VC1−VC2| between the first threshold value VC1 and the second threshold value VC2 as a proportion of stable driving.

Each of the speed variation distributions HG1, HG2, HG3, and HG4 shown in FIGS. 4-7 are an example obtained in such a manner that 20 groups are set for the speed difference Vd in units of 5 km/h in a speed difference Vd range of −40 to 50 km/h, a plurality of calculated difference values are classified into groups, and difference values belonging to each group are counted. Furthermore, a first threshold value VC1=30 km/h for calculation of a proportion of sudden acceleration events of a vehicle (i.e., first output value) and a second threshold value VC2=−30 km/h for calculation of a proportion of sudden deceleration events of the vehicle (i.e., second output value) are set in each of the speed variation distributions HG1, HG2, HG3, and HG4 shown in FIGS. 4-7.

Figure 4:
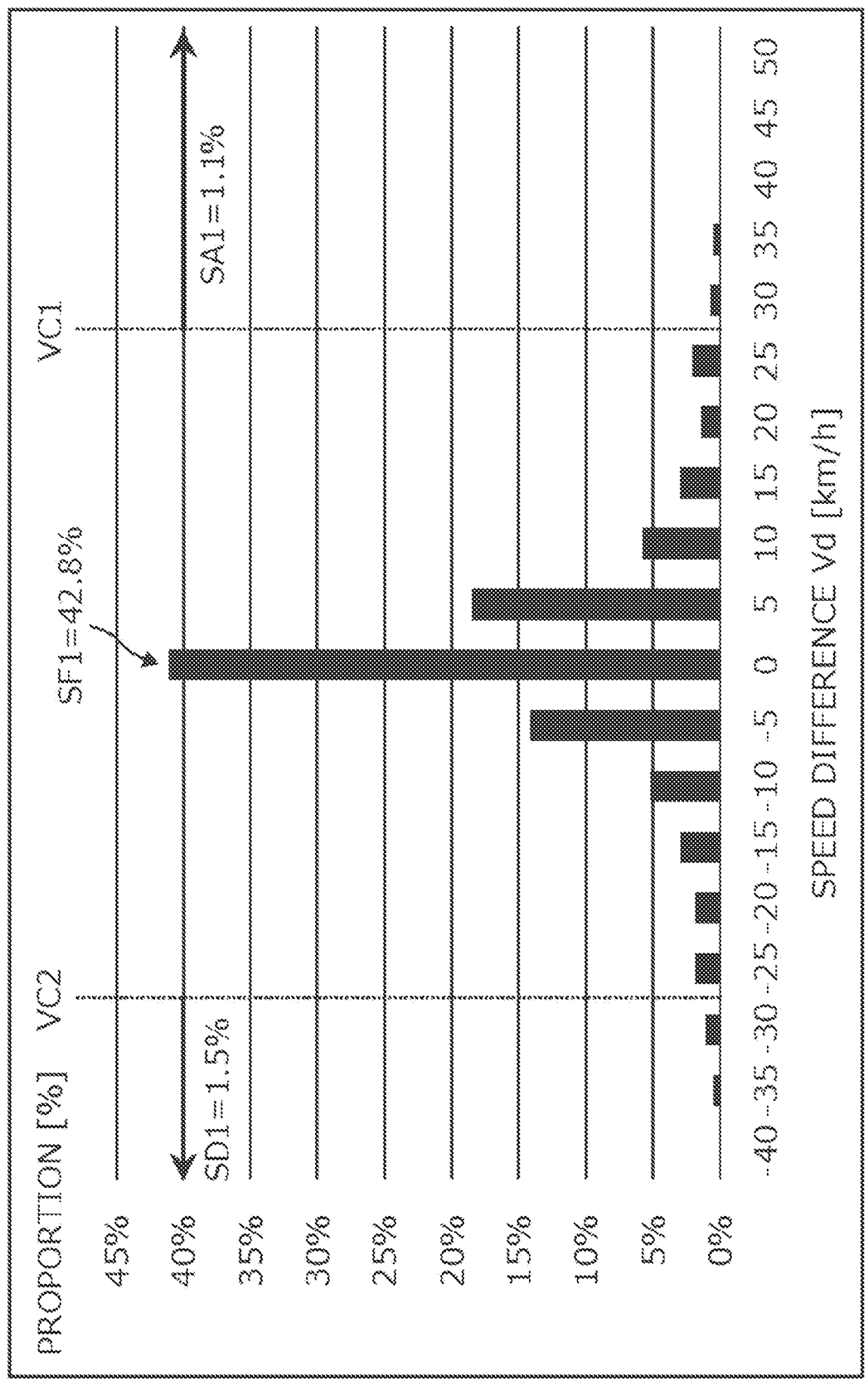
FIG. 4 is a graph of an example speed variation distribution of a driver who performs stable driving.

FIG. 4 is a graph of the example speed variation distribution HG1 of a driver AA who performs safe driving. In the speed variation distribution HG1, the vertical axis represents the proportion of each group and the horizontal axis represents the speed difference Vd. The evaluation unit 11F evaluates the manner of driving of the driver AA on the basis of the speed variation distribution HG1.

The evaluation unit 11F judges that the proportion of sudden acceleration events (first output value) and the proportion of sudden deceleration events (second output value) of a vehicle are both small and hence the driver AA performs safe driving on the basis of driving evaluation results that in the speed variation distribution HG1 shown in FIG. 4 a first output value SA1 indicating a proportion of sudden acceleration events is 1.1%, a second output value SD1 indicating a proportion of sudden deceleration events is 1.5%, and a proportion SF1 of safe driving events is 42.8%. The evaluation unit 11F stores this driving evaluation result in the memory 12 and omits to output the driving evaluation result to the output unit 13. Alternatively, the evaluation unit 11F may output the driving evaluation result to the output unit 13 so that the driver AA is notified that the driver is doing safe driving even in a case that as shown in FIG. 4 the driving evaluation result is none of sudden acceleration/sudden deceleration, sudden acceleration, and sudden deceleration (i.e., the driving evaluation result is safe driving).

Figure 5:
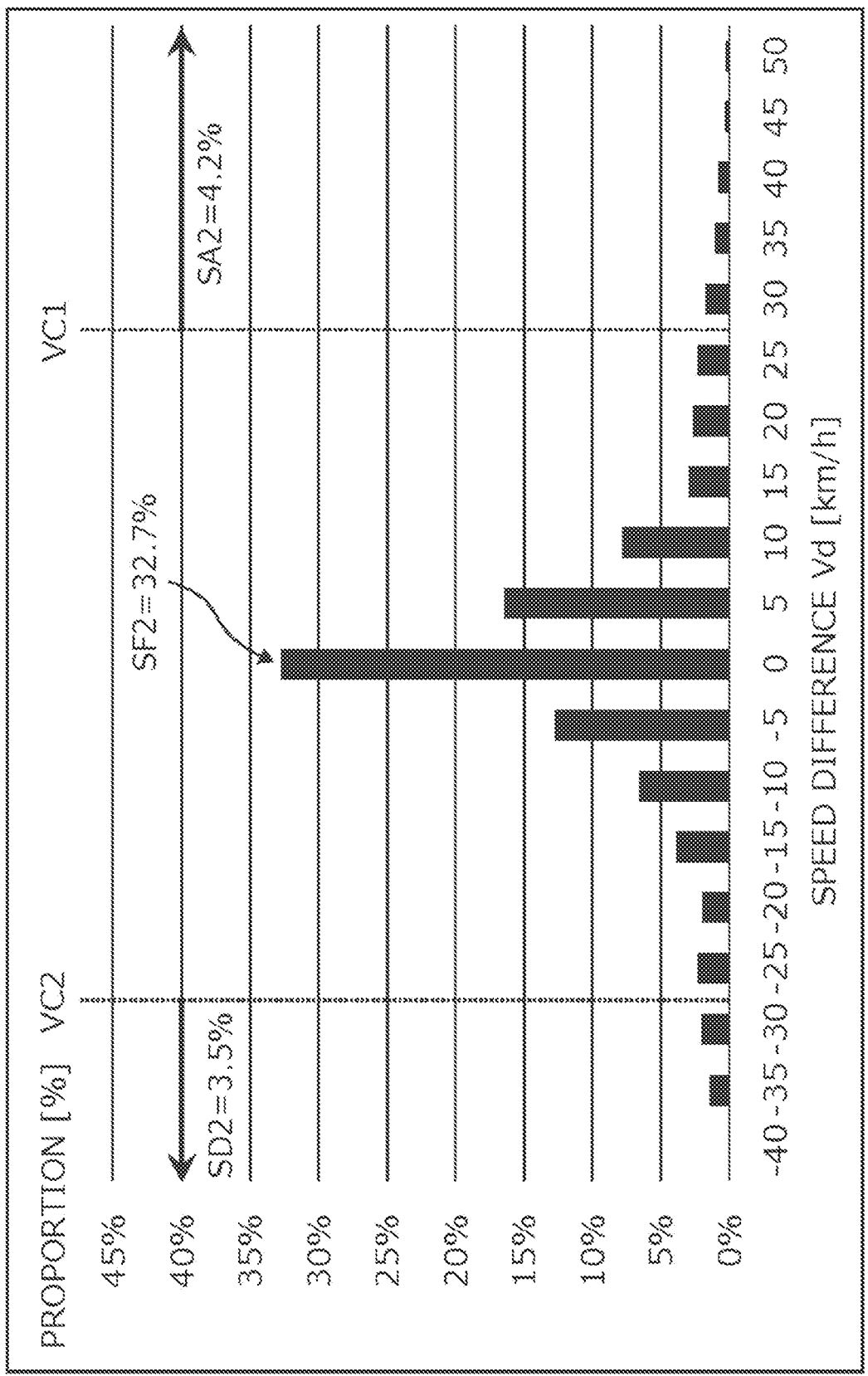
FIG. 5 is a graph of an example speed variation distribution of a driver who makes sudden acceleration and sudden deceleration frequently.

FIG. 5 is a graph of the example speed variation distribution HG2 of a driver BB who makes sudden acceleration and sudden deceleration frequently. In the speed variation distribution HG2, the vertical axis represents the proportion of each group and the horizontal axis represents the speed difference Vd. The evaluation unit 11F evaluates the manner of driving of the driver BB on the basis of the speed variation distribution HG2.

The evaluation unit 11F judges that the proportion of sudden acceleration events (first output value) and the proportion of sudden deceleration events (second output value) of a vehicle are both large (i.e., sudden acceleration/deceleration events occur frequently) on the basis of driving evaluation results that in the speed variation distribution HG2 shown in FIG. 5 a first output value SA2 indicating a proportion of sudden acceleration events is 4.2%, a second output value SD2 indicating a proportion of sudden deceleration events is 3.5%, and a proportion SF2 of safe driving events is 32.7%. The evaluation unit 11F stores this driving evaluation result in the memory 12 and outputs the driving evaluation result to the output unit 13. The output unit 13 notifies the driver BB of the driving evaluation result by generating a picture including the driving evaluation result to the effect that the driver makes sudden acceleration and sudden deceleration frequently and displaying it on the LCD or causing the speaker to output a sound indicating the driving evaluation result.

Figure 6:
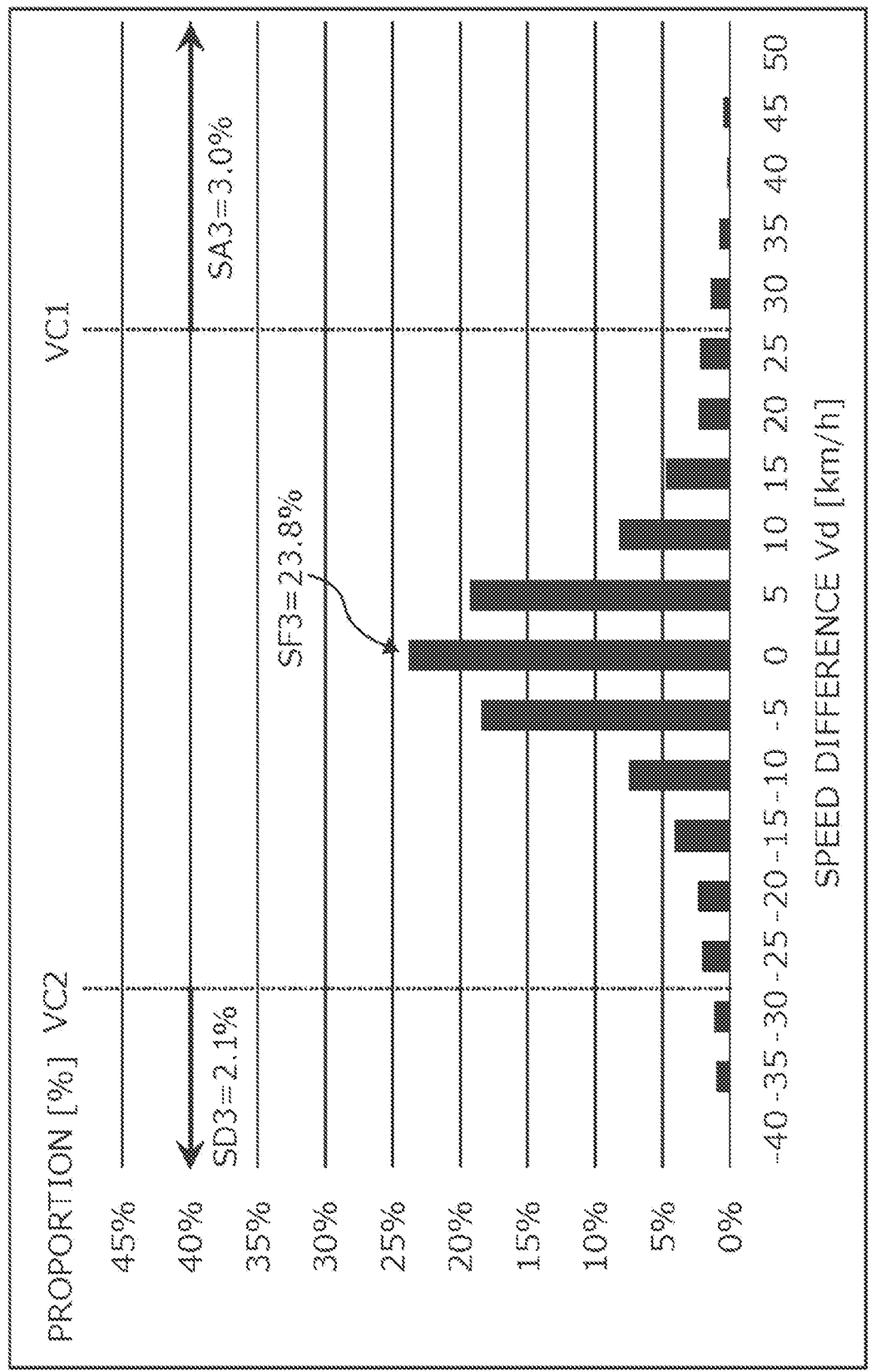
FIG. 6 is a graph of an example speed variation distribution of a driver who performs driving having a large speed variation.

FIG. 6 is a graph of the example speed variation distribution HG3 of a driver CC who performs driving with a large speed variation. In the speed variation distribution HG3, the vertical axis represents the proportion of each group and the horizontal axis represents the speed difference Vd. The evaluation unit 11F evaluates the manner of driving of the driver CC on the basis of the speed variation distribution HG3.

The evaluation unit 11F judges that in the speed variation distribution HG3 shown in FIG. 6 a first output value SA3 indicating a proportion of sudden acceleration events is 3.0%, a second output value SD3 indicating a proportion of sudden deceleration events is 2.1%, and a proportion SF3 of safe driving events is 23.8%. Based on these evaluation results, the evaluation unit 11F judges that the proportion of events that the vehicle speed is stable is small, that is, the vehicle speed is stable and hence that the driver CC makes driving with a large speed variation. The evaluation unit 11F stores this driving evaluation result in the memory 12 and omits to output the driving evaluation result to the output unit 13. Alternatively, the evaluation unit 11F may output the driving evaluation result to the output unit 13 so that the driver CC is notified that the vehicle speed is not stable.

Figure 7:
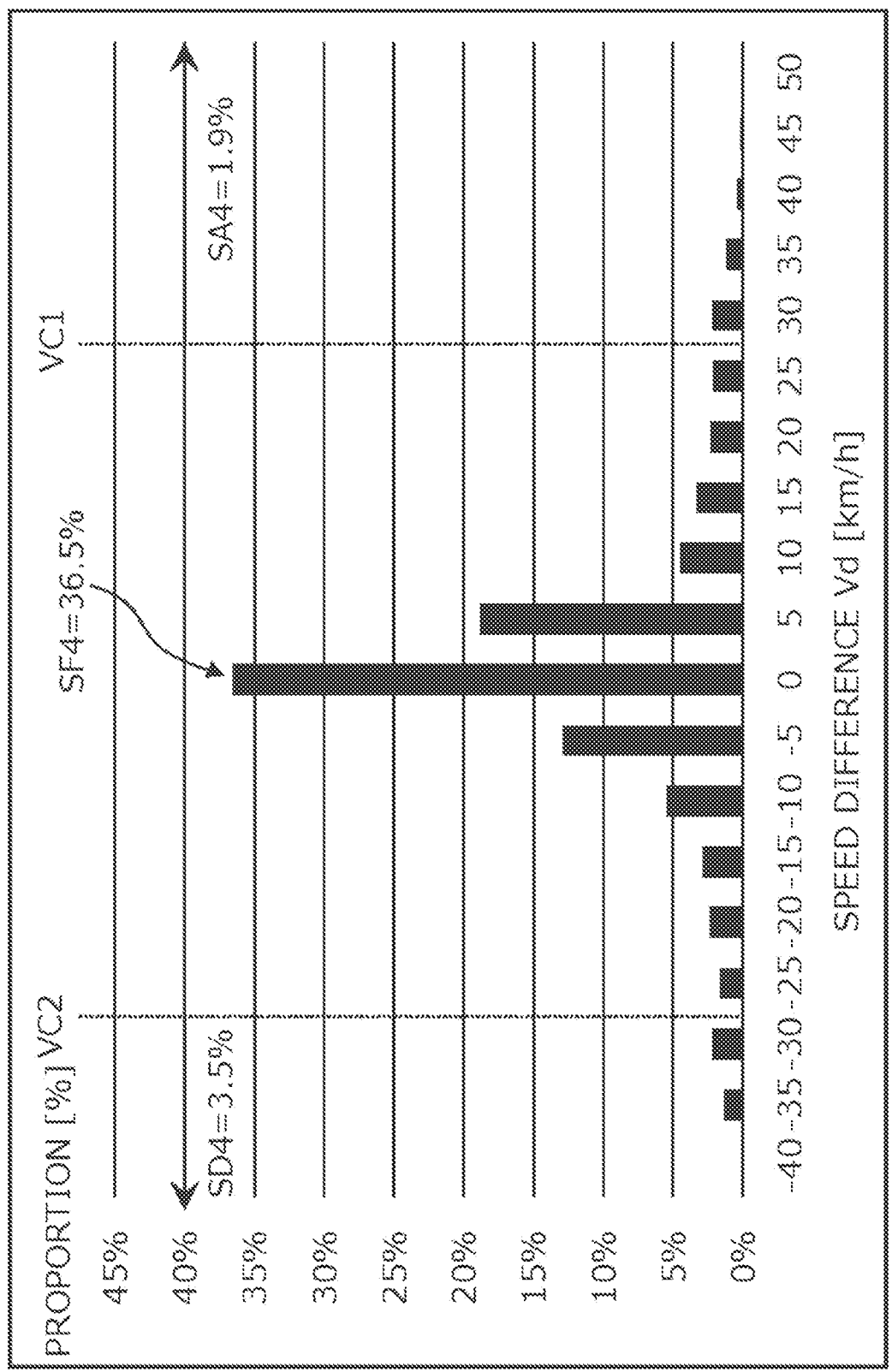
FIG. 7 is a graph of an example speed variation distribution of a driver who makes sudden deceleration frequently.

FIG. 7 is a graph of the example speed variation distribution HG4 of a driver DD who performs sudden deceleration frequently. In the speed variation distribution HG4, the vertical axis represents the proportion of each group and the horizontal axis represents the speed difference Vd. The evaluation unit 11F evaluates the manner of driving of the driver DD on the basis of the speed variation distribution HG4.

The evaluation unit 11F judges that in the speed variation distribution HG4 shown in FIG. 7 a first output value SA4 indicating a proportion of sudden acceleration events is 1.9%, a second output value SD4 indicating a proportion of sudden deceleration events is 3.5%, and a proportion SF4 of safe driving events is 36.5%. Based on these evaluation results, the evaluation unit 11F judges that the proportion of sudden deceleration events of the vehicle (second output value) is large. The evaluation unit 11F stores this driving evaluation result in the memory 12 and outputs the driving evaluation result to the output unit 13. The output unit 13 notifies the driver DD of the driving evaluation result by generating a picture including the driving evaluation result to the effect that the driver makes sudden deceleration frequently and displaying it on the LCD or causing the speaker to output a sound indicating the driving evaluation result.

Figure 8:
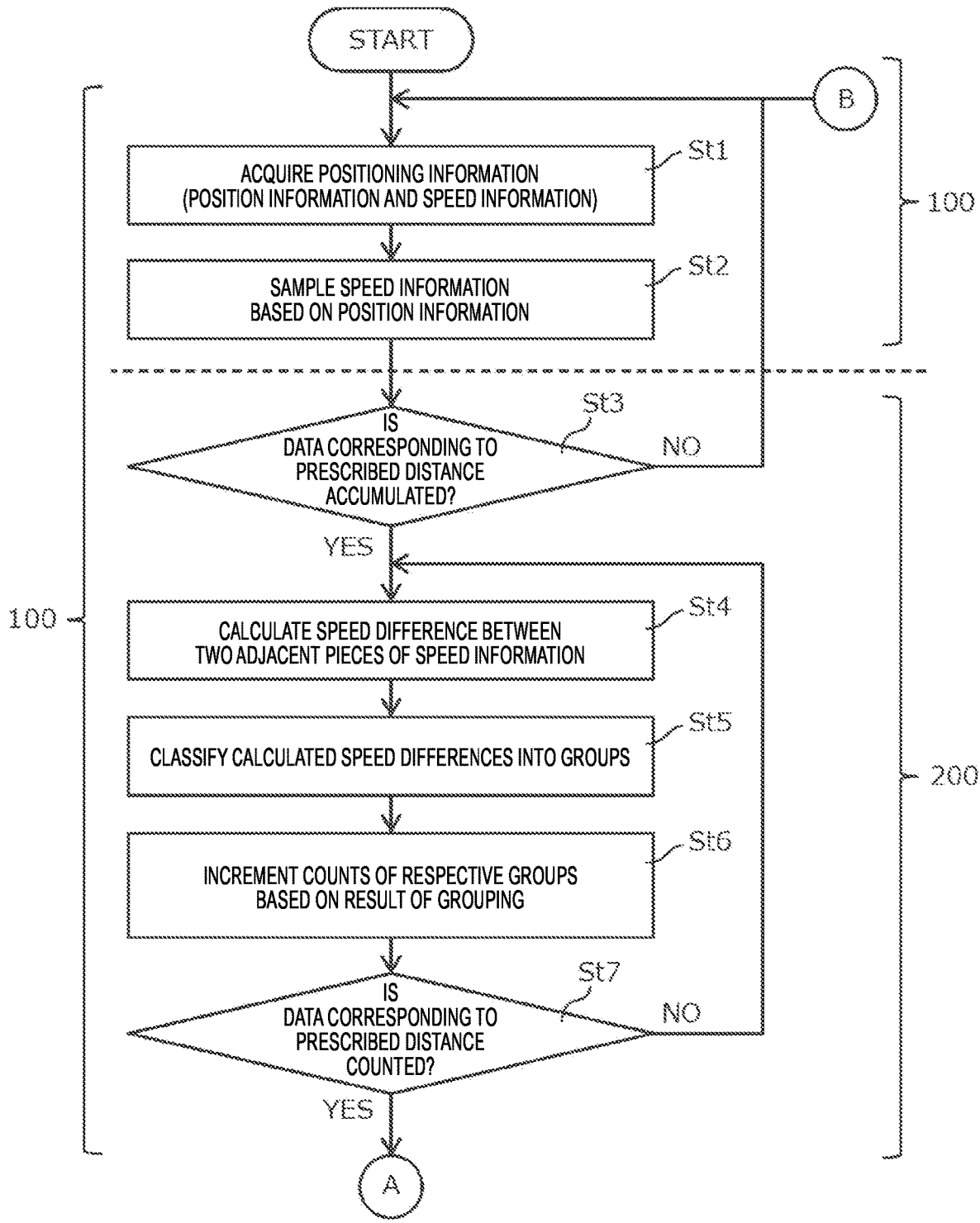
FIGS. 8 and 9 are a flowchart showing the procedure of an example driving evaluation process according to the first embodiment.
Figure 9:
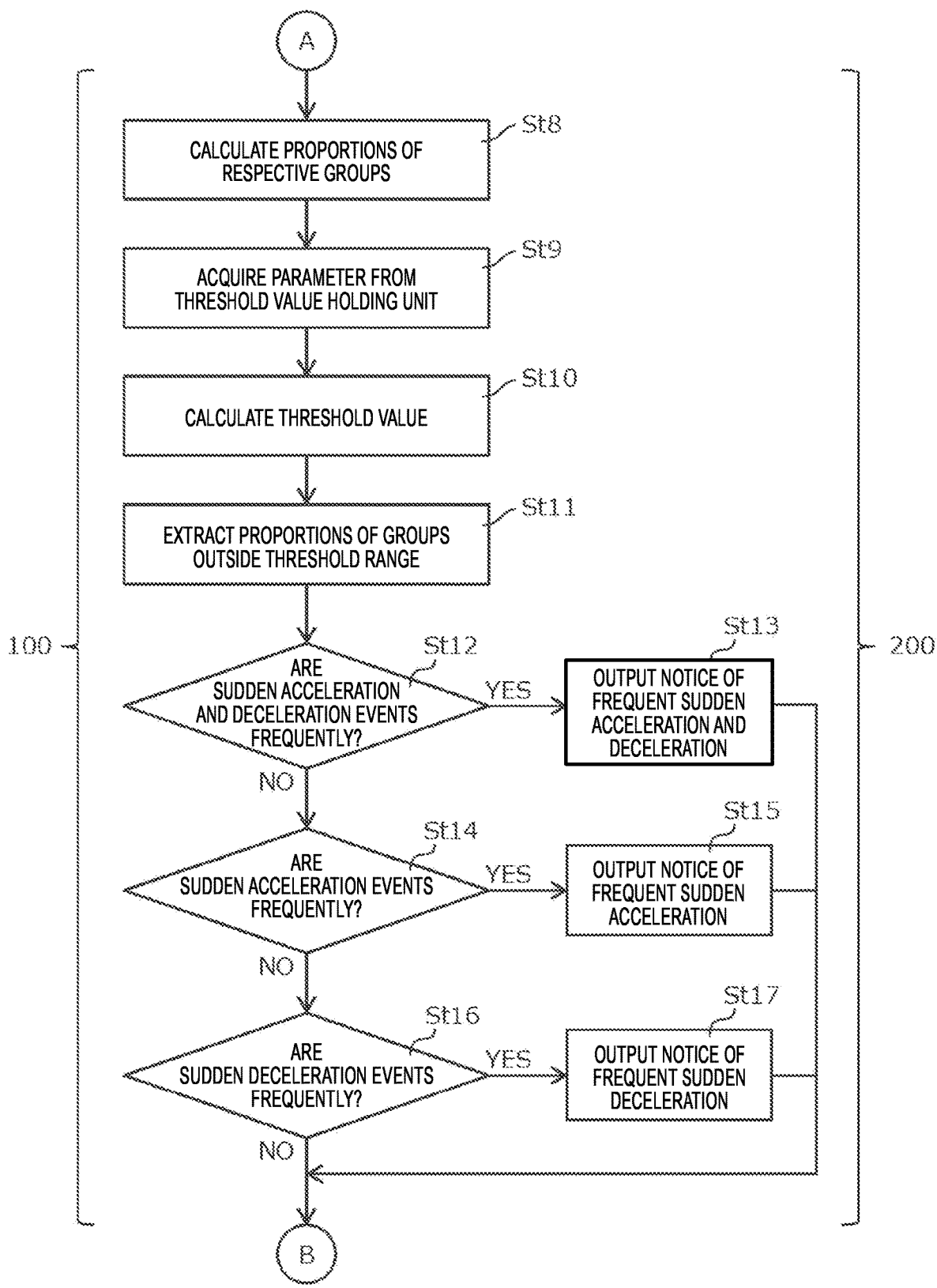

Next, the procedure of an example driving evaluation process to be executed by the in-vehicle devices CN1, . . . will be described with reference to FIGS. 8 and 9. FIGS. 8 and 9 are a flowchart showing the procedure of an example driving evaluation process according to the first embodiment. The procedure of an example driving evaluation process to be executed by the in-vehicle device CN1 incorporated in the vehicle.

At step St1, the GPS receiving unit 10B of the in-vehicle device CN1 receives satellite positioning signals transmitted from the respective artificial satellites G1, . . . and calculates and acquires position information and speed information of the vehicle that is traveling as positioning information on the basis of the received satellite positioning signals. The unit that performs processing of calculating position information and speed information is not restricted to the GPS receiving unit 10B and may be the positioning unit 11A (i.e., processor 11). The acquired position information and speed information are output to the sampling unit 11B via the positioning unit 11A.

The sampling unit 11B acquires the current position information and speed information of the vehicle. If detecting that the vehicle has moved by the preset first prescribed distance (e.g., 100 m, 150 m, or 200 m) or more on the basis of pieces of position information of the vehicle, at step St2 the sampling unit 11B samples speed information acquired at the timing of this detection. The sampling unit 11B outputs pieces of speed information acquired by a plurality of times of sampling to the distribution shape calculation unit 11C to store the pieces of speed information in the distribution shape calculation unit 11C.

At step St3, the distribution shape calculation unit 11C judges whether sampled pieces of speed information corresponding to a second prescribed distance (e.g., 30 km or 40 km) have been accumulated on the basis of pieces of position information indicating positions where the respective sampled and accumulated pieces of speed information were acquired.

If judging that sampled pieces of speed information corresponding to the second prescribed distance have been accumulated (St3: yes), at step St4 the distribution shape calculation unit 11C calculates a difference value (speed difference value) between two pieces of speed information that are adjacent to each other in the time series (i.e., a speed indicated by speed information sampled by kth sampling and a speed indicated by speed information sampled by (k+1)th sampling) among the plurality of sampled and accumulated pieces of speed information. If speed information sampled by the kth sampling is speed information of the latest sampling, the distribution shape calculation unit 11C may calculate a speed difference value between a speed indicated by the speed information sampled by the kth sampling and a speed indicated by speed information sampled by (k−1)th sampling. In this case, k is an integer that is larger than or equal to 2.

On the other hand, if the distribution shape calculation unit 11C judges that sampled pieces of speed information corresponding to the second prescribed distance have not been accumulated yet (St3: no), the process returns to step St1 and the accumulation of sampled pieces of speed information that are output from the sampling unit 11B is continued.

At step St5, the distribution shape calculation unit 11C classifies a plurality of calculated difference values (speed differences) into a plurality of groups having different, prescribed speed ranges (e.g., 0-5 km/h, 5-10 km/h, . . . ) that were set in advance.

At step St6, based on a result of the grouping, the distribution shape calculation unit 11C increments the count of each group the number of times that is equal to the number of difference values belonging to the group. If the distribution shape calculation unit 11C is stored with information of the numbers of sets of difference values (data) belonging to the respective groups that were counted when grouping was done last time as in, for example, a case that it is judged at step St7 (described later) that difference values (data) corresponding to the second prescribed distance have not been subjected to counting yet, the distribution shape calculation unit 11C increments the count of each group of the preceding grouping the number of times that is equal to the number of difference values (data) belonging to the group of the grouping of this time.

After counting the numbers of sets of difference values (data) belonging to the respective groups, at step St7 the distribution shape calculation unit 11C judges whether difference values (data) have been counted in a number corresponding to the preset second prescribed distance, on the basis of the number of counted difference values (data). This allows the in-vehicle device CN1 to judge whether pieces of data have been collected in such a number as to be necessary for evaluation of the manner of driving of the driver of the vehicle and to thereby suppress reduction of the accuracy of a result of evaluation of the manner of driving.

If judging that difference values (data) have been counted in a number corresponding to the preset second prescribed distance, on the basis of the number of counted difference values (data) after counting the numbers of sets of difference values (data) belonging to the respective groups (St7: yes), the distribution shape calculation unit 11C calculates proportions of sets of difference values (data) belonging to the respective groups (St8) and generates a speed variation distribution including proportion information of difference values belonging to each group. The distribution shape calculation unit 11C outputs the generated speed variation distribution to the evaluation unit 11F. The step of generating a speed variation distribution is not indispensable; the proportions of sets of difference values (data) belonging to the respective groups may be output to the evaluation unit 11F.

On the other hand, if the distribution shape calculation unit 11C judges that difference values (data) have not been counted in a number corresponding to the preset second prescribed distance, on the basis of the number of counted difference values (data) after counting the numbers of sets of difference values (data) belonging to the respective groups (St7: no), the process returns to step St4.

At step St9, the threshold value determining unit 11E selects and acquires at least one parameter value from a plurality of parameter values stored in the threshold value holding unit 11D on the basis of parameter value selection information. Only one parameter value may be stored in the threshold value holding unit 11D.

At step St10, the threshold value determining unit 11E calculates threshold values (first threshold value and second threshold value) on the basis of the respective selected parameter values and outputs the calculated threshold values to the evaluation unit 11F. The threshold value determining unit 11E may calculate a third threshold value on the basis of a selected parameter value and outputs it to the evaluation unit 11F.

At step St11, the evaluation unit 11F calculates a first output value indicating a proportion of data belonging to such groups as to be larger than or equal to the first threshold value (i.e., a proportion of sudden acceleration events) and a second output value indicating a proportion of data belonging to such groups as to be smaller than or equal to the second threshold value (i.e., a proportion of sudden deceleration events) on the basis of the speed variation distribution that was output from the distribution shape calculation unit 11C and the threshold values (first threshold value and second threshold value) that were output from the threshold value determining unit 11E. Where the third threshold value is output from the threshold value determining unit 11E, the evaluation unit 11F generates a speed variation distribution by excluding difference values having absolute values larger than or equal to the third threshold value (i.e., groups of difference values having absolute values larger than or equal to the third threshold value) from the current speed variation distribution and calculates a first output value indicating a proportion of sudden acceleration events and a second output value indicating a proportion sudden deceleration events on the basis of the generated speed variation distribution and the first and second threshold values. With this measure, the in-vehicle device CN1 can eliminate abnormal values to become noise in evaluating the manner of driving of the driver of the vehicle and hence can obtain a more accurate driving evaluation result.

At step St12, the evaluation unit 11F judges whether sudden acceleration/deceleration events occurred frequently on the basis of the calculated first output value and second output value. For example, at step St12, the evaluation unit 11F judges whether the first output value and the second value are both larger than or equal to a prescribed evaluation reference value (threshold value; e.g., 3.0% or 5.0%) for sudden acceleration and sudden deceleration. Alternatively, different evaluation reference values may be set as a prescribed evaluation reference value (threshold value) for a first output value and a prescribed evaluation reference value (threshold value) for a second output value.

If judging that sudden acceleration/deceleration events occurred frequently (i.e., the first output value and the second value are both large) (St12: yes), at step St13 the evaluation unit 11F generates a notice to the effect that the driving evaluation result is frequent sudden acceleration/ deceleration and causes the output unit 13 to output it.

On the other hand, if judging that sudden acceleration/ deceleration events did not occur frequently (i.e., at least one of the first output value and the second value is not large) (St12: no), at step S14 the evaluation unit 11F judges whether sudden acceleration events occurred frequently on the basis of the calculated first output value. For example, at step St14, the evaluation unit 11F judges whether only the first output value is larger than or equal to the prescribed evaluation reference value (threshold value) that was used at step St12 or the prescribed evaluation reference value (threshold value) for a first output value.

If judging that sudden acceleration events occurred frequently (i.e., the first output value is large) (St14: yes), at step St15 the evaluation unit 11F generates a notice to the effect that the driving evaluation result is frequent sudden acceleration and causes the output unit 13 to output it.

On the other hand, if judging that sudden acceleration events did not occur frequently (i.e., the first output value is not large) (St14: no), at step S16 the evaluation unit 11F judges whether sudden deceleration events occurred frequently on the basis of the calculated second output value. For example, at step St16, the evaluation unit 11F judges whether only the second output value is larger than or equal to the prescribed evaluation reference value (threshold value) that was used at step St12 or the prescribed evaluation reference value (threshold value) for a second output value.

If judging that sudden deceleration events occurred frequently (i.e., the second output value is large) (St16: yes), at step St17 the evaluation unit 11F generates a notice to the effect that the driving evaluation result is frequent sudden deceleration and causes the output unit 13 to output it. Then the process returns to step St1, where the in-vehicle device CN1 acquires positioning information to perform driving evaluation again.

On the other hand, judging that sudden deceleration events did not occur frequently (i.e., the second output value is not large) (St16: no), the process returns to step St1, where the in-vehicle device CN1 acquires positioning information to perform driving evaluation again.

At timing when the process returns from step St13, St15, St16 or St17 to step St1, the in-vehicle device CN1 stores the latest driving evaluation result in the memory 12 and erases the various kinds of data used for performing the latest driving evaluation (e.g., acquired positioning information, stored sampled speed information, counts of sets of difference values (data) belonging to the respective groups, information of the threshold values, and speed variation distribution). The in-vehicle device CN1 may store the various kinds of data and the driving evaluation result in the memory 12 in association with one another. Where the various kinds of data are stored in the memory 12, they may be erased on a regular basis, that is, every prescribed validity period (e.g., one week, on month, or three months) that is set in advance.

Furthermore, the in-vehicle device CN1 may increase the number of sampled pieces of data (i.e., population) to be used for the next driving evaluation by adding sets of difference values (data) belonging to the respective groups to be counted in performing driving evaluation next time to the difference values (data) used for the latest driving evaluation if there is no change in the parameter value selection information. This allows the in-vehicle device CN1 to evaluate the manner of driving of the driver more accurately.

Where various kinds of data are processed in a driving evaluation process (described below) executed by a server S1 according to a second embodiment, they are processed in the same manner as in the above-described first embodiment.

Modification of Embodiment 1

Each of the above-described in-vehicle devices CN1, . . . according to the first embodiment generates a speed variation distribution using difference values (speed difference values) calculated on the basis of pieces of speed information of the vehicles and evaluates the manner of driving of the driver on the basis of the generated speed variation distribution. In a modification of the first embodiment described below, each of in-vehicle devices CN1, . . . calculates acceleration values of the vehicle, generates an acceleration distribution and evaluates the manner of driving of the driver on the basis of the generated acceleration distribution.

A driving evaluation device 100 (each of in-vehicle devices CN1, . . . ) according to the modification of the first embodiment are similar in configuration as the driving evaluation device 100 (each of in-vehicle devices CN1, . . . ) according to the first embodiment, and similar description is omitted. Only parts of the configuration and the process of the driving evaluation device 100 according to the modification of the first embodiment that are different than in the driving evaluation device 100 according to the first embodiment will be described below.

Furthermore, each kind of processing (described below) performed by each of the in-vehicle devices CN1, . . . according to the modification of the first embodiment may be performed by the server S1 according to the second embodiment.

Figure 10:
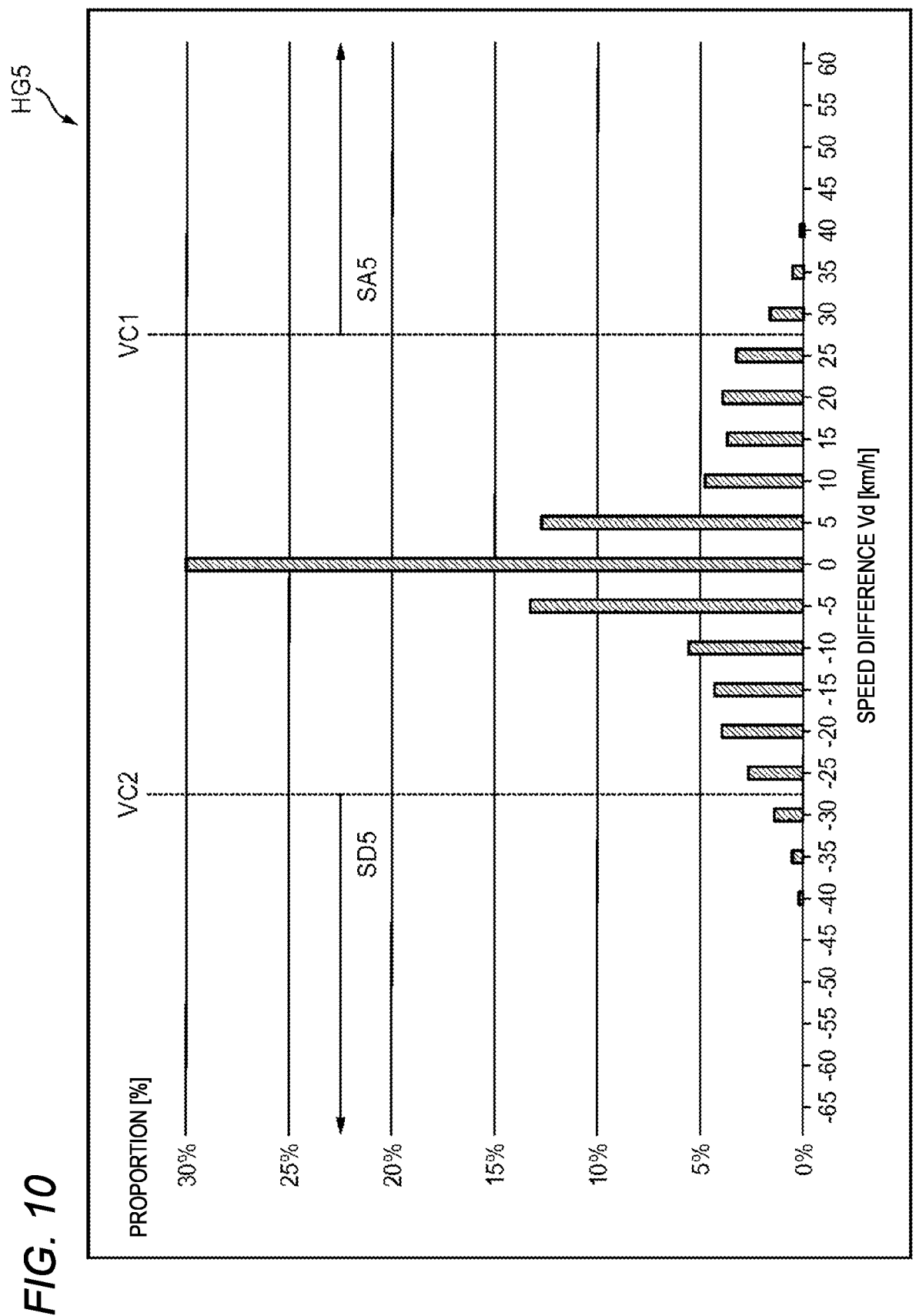
FIG. 10 is a graph of an example speed variation distribution of a driver generated according to a modification of the first embodiment.

FIG. 10 is a graph of an example speed variation distribution HG5 of a driver according to the modification of the first embodiment. The in-vehicle device CN1, for example, according to the modification of the first embodiment generates the speed variation distribution HG5 of the driver shown in FIG. 10 and evaluates the manner of driving of the driver on the basis of the generated speed variation distribution HG5.

The in-vehicle device CN1, for example, calculates a first output value SA5 indicating a proportion of sudden acceleration events (speed differences are larger than or equal to the first threshold value VC1) and a second output value SD5 indicating a proportion of sudden deceleration events (speed differences are smaller than or equal to the second threshold value VC2). The driving evaluation device 100 evaluates the manner of driving of the driver on the basis of the proportion indicated by the calculated first output value SA5 and the proportion indicated by the calculated second output value SD5 and generates a driving evaluation result.

Now an equation for calculating the acceleration A is obtained as follows by modifying Equation (1). In the following Equation (2), it is assumed that the speed difference between a speed sampled kth and a speed sampled (k+1)th is a speed difference of constant speed traveling.

(Equation (2))

$$A = \frac{Vd(2V0 + Vd)}{2D} \qquad (2)$$

In the modification of the first embodiment, the distribution shape calculation unit 11C calculates acceleration A according to Equation (2) on the basis of a speed represented by speed information sampled kth and a speed represented by speed information sampled (k+1)th (adjacent to the speed information sampled kth) when 150 sampled pieces of speed information, for example, are accumulated in the distribution shape calculation unit 11C of, for example, the in-vehicle device CN1.

The distribution shape calculation unit 11C classifies a plurality of calculated acceleration values A (data) into a plurality of groups having different prescribed ranges (e.g., 0-0.005 G, 0.005-0.01 G, . . . ) and increments the count of each group the number of times that is equal to the number of acceleration values A belonging to the group.

After counting the number of acceleration values A (data) belonging to each group, the distribution shape calculation unit 11C judges whether acceleration values A (data) of a second prescribed distance that was set in advance have been subjected to counting. If judging that acceleration values A (data) of the second prescribed distance have been subjected to counting, the distribution shape calculation unit 11C calculates a proportion of acceleration values A (data) belonging to each group with respect to the total number of acceleration values A (data) and generates an acceleration distribution HG6 (see FIG. 11) that includes proportions of sets of acceleration values A (data) belonging to the respective groups. On the other hand, if judging that acceleration values A (data) of the second prescribed distance have not been subjected to counting yet, the distribution shape calculation unit 11C continues to calculate difference values. The distribution shape calculation unit 11C outputs the generated acceleration distribution HG6 to the evaluation unit 11F.

Figure 11:
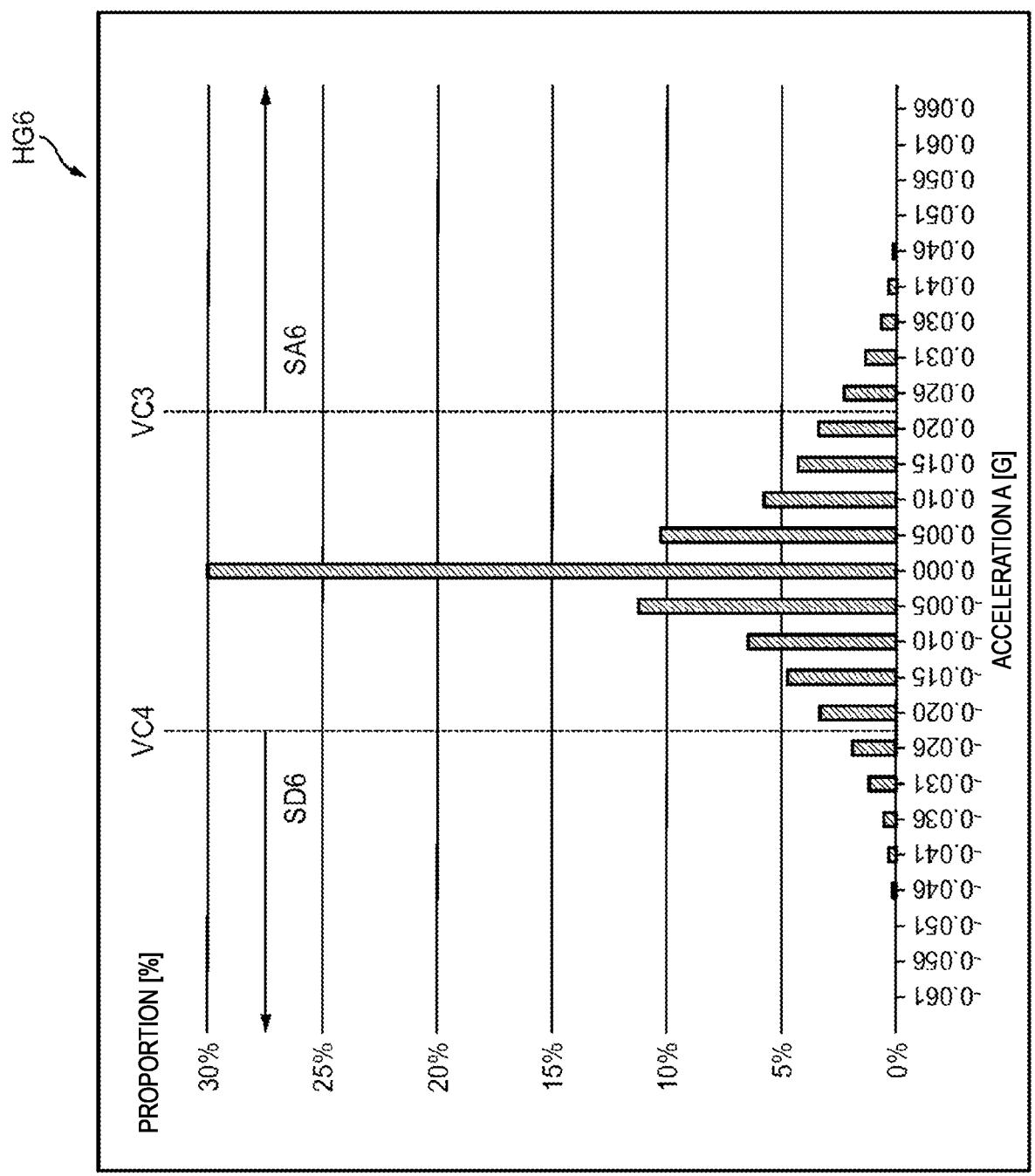
FIG. 11 is a graph of an example acceleration distribution of a driver generated according to the modification of the first embodiment.

The acceleration distribution HG6 will now be described with reference to FIG. 11. FIG. 11 is a graph of an example acceleration distribution HG6 of a driver according to the modification of the first embodiment. The acceleration distribution HG6 shown in FIG. 11 is just an example and the invention is not limited to it.

The in-vehicle device CN1, for example, according to the modification of the first embodiment calculates acceleration values on the basis of acquired pieces of speed information of the vehicle. The in-vehicle device CN1 generates an acceleration distribution HG6 of a driver on the basis of the calculated acceleration values A (data).

The in-vehicle device CN1 calculates a fourth output value SA6 indicating a proportion of acceleration values A that are larger than or equal to a fourth threshold value VC3 indicating sudden acceleration. The in-vehicle device CN1 also calculates a fifth output value SD6 indicating a proportion of acceleration values A that are smaller than or equal to a fifth threshold value VC4 indicating sudden deceleration. The in-vehicle device CN1 evaluates the manner of driving of the driver on the basis of the proportion indicated by the calculated fourth output value SA6 and the proportion indicated by the calculated fifth output value SD6.

For example, in the examples shown in FIG. 11, the in-vehicle device CN1 sets, as a fourth threshold value VC3, acceleration A=+0.02 G at which the vehicle can be driven stably on a road and sets acceleration A=−0.02 G as a fifth threshold value VC4. The fourth threshold value VC3 and the fifth threshold value VC4 may be determined by the same methods as the first threshold value VC1 and the second threshold value VC2 are, respectively. Threshold values for calculating a fourth output value SA6 and a fifth output value SD6 may be determined by the same methods as threshold values for calculating a first output value and a second output value are, respectively.

Figure 12:
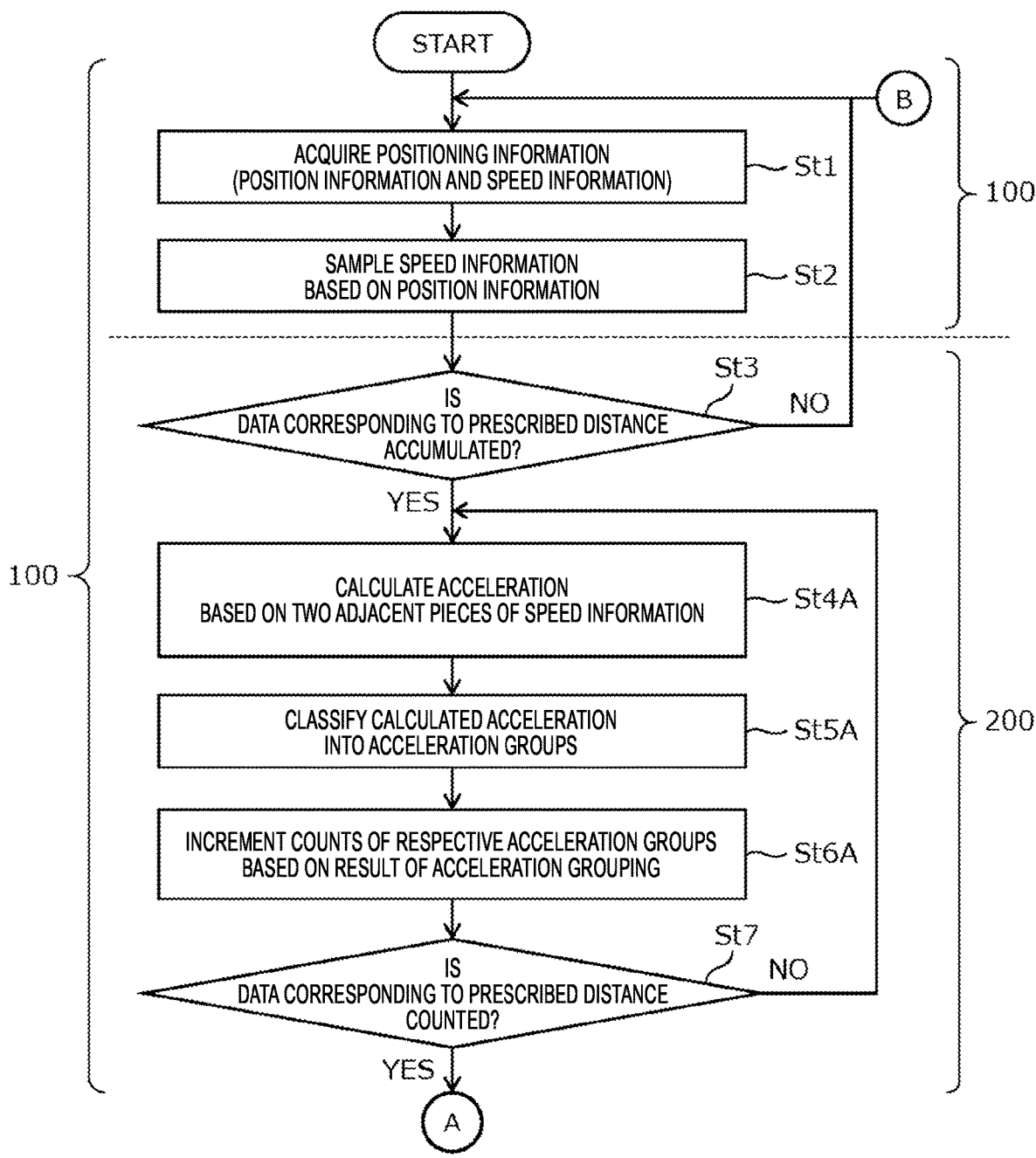
FIG. 12 is a flowchart showing the procedure of an example driving evaluation process according to the modification of the first embodiment.

Next, the procedure of a driving evaluation process according to the modification of the first embodiment will be described with reference to FIG. 12. FIG. 12 is a flowchart showing the procedure of an example driving evaluation process according to the modification of the first embodiment. Steps St1-St3 and St 7 of the driving evaluation process shown in FIG. 12 are approximately the same as those of the driving evaluation process shown in FIG. 8 and hence descriptions therefor will be omitted.

If judging that sampled pieces of speed information corresponding to the second prescribed distance have been accumulated (St3: yes), at step St4A the distribution shape calculation unit 11C calculates an acceleration value (speed difference) on the basis of two pieces of speed information that are adjacent to each other in the time series (i.e., a speed indicated by speed information sampled by kth sampling and a speed indicated by speed information sampled by (k+1)th sampling) among the plurality of sampled and accumulated pieces of speed information. If speed information sampled by the kth sampling is speed information of the latest sampling, the distribution shape calculation unit 11C may calculate an acceleration value on the basis of a speed indicated by the speed information sampled by the kth sampling and a speed indicated by speed information sampled by (k−1)th sampling. In this case, k is an integer that is larger than or equal to 2.

At step St5A, the distribution shape calculation unit 11C classifies a plurality of calculated acceleration values (data) into a plurality of groups having different, prescribed acceleration ranges (e.g., 0-0.005 G, 0.005-0.01 G, . . . ) that were set in advance.

At step St6A, based on a result of the grouping, the distribution shape calculation unit 11C increments the count of each group the number of times that is equal to the number of acceleration values belonging to the group. If the distribution shape calculation unit 11C is stored with information of the numbers of sets of acceleration values (data) belonging to the respective groups that were counted when grouping was done last time as in, for example, a case that it is judged at step St7 (described later) that acceleration values (data) corresponding to the second prescribed distance have not been subjected to counting yet, the distribution shape calculation unit 11C increments the count of each group of the preceding grouping the number of times that is equal to the number of acceleration values (data) belonging to the group of the grouping of this time.

Embodiment 2

In the above-described driving evaluation device 100 according to the first embodiment, the in-vehicle devices CN1, . . . installed in the vehicles evaluate the manners of driving of drivers of the vehicles, respectively. In a driving evaluation device 200 according to a second embodiment, a server S1 that has collected pieces of sampled speed information of the respective vehicles C1, . . . from in-vehicle devices CN1A, . . . installed in the respective vehicles C1, . . . evaluates the manners of driving of drivers of the vehicles C1, . . . , respectively. In the following description of the driving evaluation device 200 according to the second embodiment, different parts of the configuration and different pieces of processing than in the driving evaluation device 100 according to the first embodiment will be described.

Figure 13:
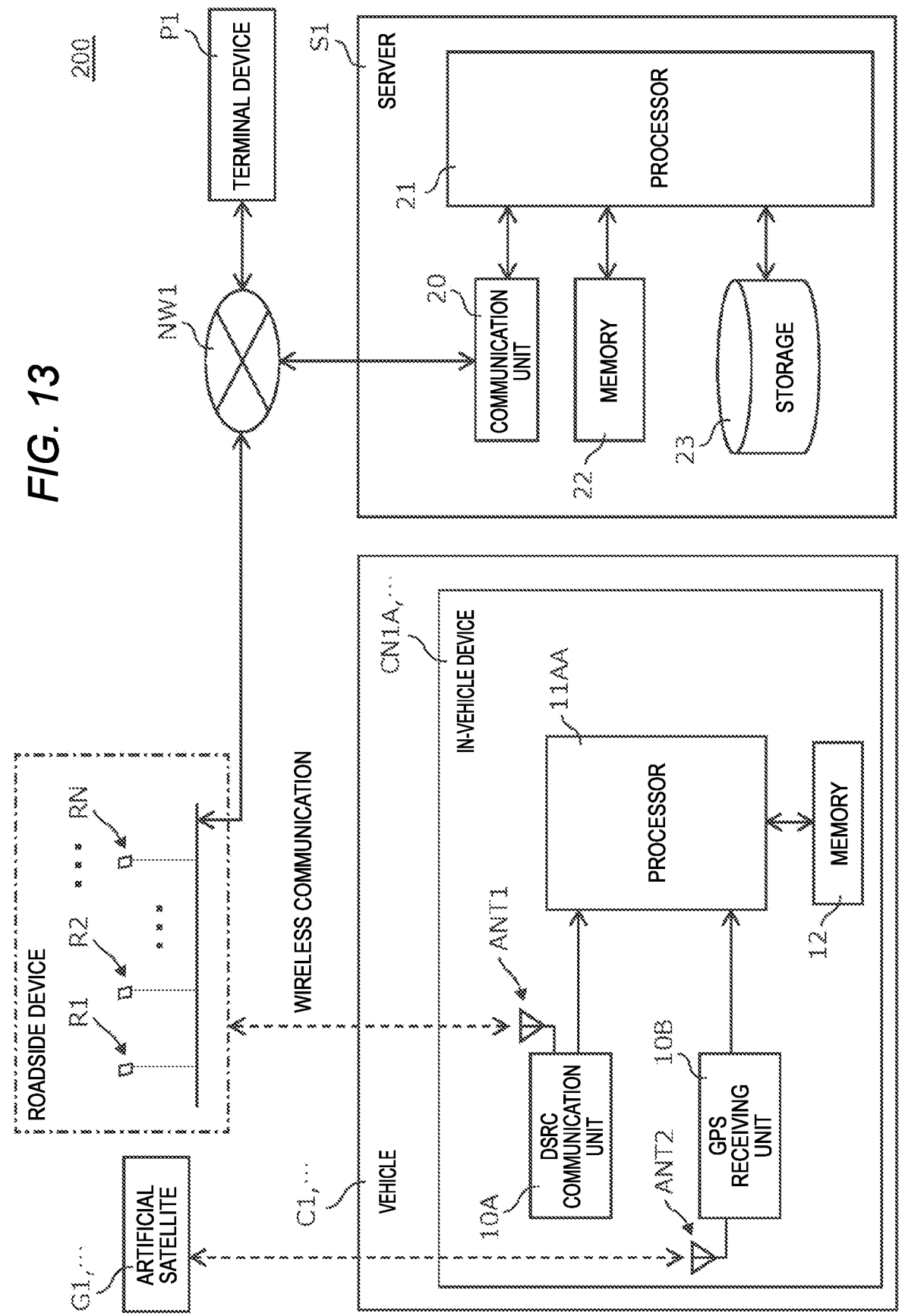
FIG. 13 is a block diagram showing an example driving evaluation system according to a second embodiment.

FIG. 13 is a block diagram showing an example driving evaluation system 200 according to the second embodiment. Since in FIG. 13 the plurality of vehicles C1, . . . are similar in configuration and the plurality of in-vehicle devices CN1A, . . . are the same in configuration, the following description will be directed to the vehicle C1 and the in-vehicle device CN1A.

The driving evaluation system 200 according to the second embodiment is configured so as to include artificial satellites G1, . . . , at least one in-vehicle device CN1A, . . . installed in a vehicle C1, . . . , roadside devices R1, . . . , RN, a network NW1, and the server S1. Although in FIG. 13 a terminal device P1 is provided separately from the server S1, it may be integrated with the server S1. One or more intermediate servers (not shown) or relay servers (not shown) may be provided between each of the plurality of roadside devices R1, . . . , RN and the server S1 and data communications may be performed via the intermediate servers or relay servers.

Each of the plurality of roadside devices R1, . . . , RN is connected to the in-vehicle device CN1A so as to be able to perform wireless communication with it, and is connected to the server S1 in such a manner that wireless or wired data communication can be performed between them over the network NW1. The intermediate server or relay server for relaying data to be communicated may be connected between each of the plurality of roadside devices R1, . . . , RN and the server S1. Each of the plurality of roadside devices R1, . . . , RN acquires sampled pieces of speed information of the vehicle C1, pieces of position information indicating positions where the sampled pieces of speed information were acquired, identification information of the in-vehicle device CN1A, and other information that are transmitted from the in-vehicle device CN1A, and transmits these acquired pieces of information to the server S1 in such a manner that they are associated with the identification information of the in-vehicle device CN1A.

The server S1, which is an example of the term "information providing system," is connected to each of the plurality of roadside devices R1, . . . , RN and the terminal device P1 via the network NW1 so as to be able to perform data communication with them. The server S1 acquires one or more pieces of sampled speed information, one or more pieces of position information, and the identification information of the in-vehicle device that are transmitted from each of the plurality of in-vehicle device CN1A, . . . via the plurality of roadside devices R1, . . . , RN. The server S1 outputs the acquired sampled pieces of speed information and pieces of position information to a storage 23 and stores them in the storage 23 in such a manner that they are associated with the identification information of the in-vehicle device. The server S1 evaluates the manner of driving of each vehicle (i.e., a driver of each vehicle) on the basis of sampled pieces of speed information acquired from the vehicle.

The terminal device P1, which is a PC (personal computer), a notebook PC, a tablet PC, a smartphone, or the like, is connected to the server S1 so as to be able to perform data communication with it over the network NW1. Including at least a monitor (not shown), the terminal device P1 acquires a driving evaluation result transmitted from the server S1 and outputs (displays) it.

The network NW1 connects each of the roadside devices R1, . . . , RN, the server S1, and the terminal device P1 in such a manner that wireless or wired data communication can be performed between them. The term "wireless communication" as used herein is communication that is provided according to a wireless communication standard of a wireless LAN (local area network), a wireless WAN (wide area network), a 4G system (fourth generation mobile communication system), a 5G system (fifth generation mobile communication system), a Wi-Fi (registered trademark), or the like.

The in-vehicle device CN1A employed in the second embodiment is configured so as to include a DSRC communication unit 10A, a GPS receiving unit 10B, a processor 11AA, and a memory 12. The processor 11AA of the in-vehicle device CN1A is configured so as to include a positioning unit 11A and a sampling unit 11B.

The in-vehicle device CN1A (i.e., driving evaluation device 100) employed in the second embodiment executes steps St1 and St2 of the driving evaluation process shown in FIGS. 8 and 9 and transmits, to the roadside devices R1, . . . , RN, sampled pieces of speed information, pieces of position information indicating positions where these pieces of speed information were acquired, and the identification information of the in-vehicle device CN1A in such a manner that the sampled pieces of speed information and the pieces of position information are associated with the identification information of the in-vehicle device CN1A.

The in-vehicle device CN1A employed in the second embodiment is connected to each of the roadside devices R1, . . . , RN so as to be able to perform data communication with it, and transmits, to the roadside devices R1, . . . , RN, pieces of speed information sampled by the sampling unit 11B, pieces of position information indicating positions where these pieces of speed information were acquired, and the identification information of the in-vehicle device CN1A in such a manner that the sampled pieces of speed information and the pieces of position information are associated with the identification information of the in-vehicle device CN1A. The in-vehicle device CN1A may transmit, to the plurality of roadside devices R1, . . . , RN, parameter value selection information (e.g., date/time information) at a time of acquisition of the sampled pieces of speed information in association with the sampled pieces of speed information, the pieces of position information, and the identification information of the in-vehicle device CN1A. The plurality of roadside devices R1, . . . , RN transmit the received sampled pieces of speed information, pieces of position information, and identification information of the in-vehicle device CN1A to the server S1 over the network NW1.

In the in-vehicle device CN1A, the DSRC communication unit 10A transmits sampled pieces of speed information, pieces of position information, and the identification information of the in-vehicle device CN1A. The DSRC communication unit 10A transmits, by means of a DRSC antenna ANT1, sampled pieces of speed information, pieces of position information, and the identification information of the in-vehicle device CN1A to the plurality of roadside devices R1, . . . , RN such as ITS spots (registered trademark) or ETC 2.0 (registered trademark) roadside devices. The DRSC antenna ANT1 may be incorporated in the processor 11.

For example, each of the plurality of roadside devices R1, . . . , RN is an ITS (Intelligent Transport Systems) spot (registered trademark) installed at the roadside of an expressway, a general road, or the like or an ETC (Electronic Toll Collection) 2.0 (registered trademark) roadside device that enables, for example, collection of route information. Each of the plurality of roadside devices R1, . . . , RN employs DSRC (Dedicated Short Range Communication) as a wireless communication method and hence can perform high-speed, large-capacity information transmission. Communication of DSRC provides narrow-area communication performed between each of the roadside devices R1, . . . , RN and the in-vehicle device CN1A (signal transmission range: several meters to 30 m). DSRC uses a 5.8 MHz frequency band.

The in-vehicle device CN1A may further include a wireless communication unit (not shown). In this case, the in-vehicle device CN1A may cause the wireless communication unit to transmit sampled pieces of speed information, pieces of position information, and the identification information of the in-vehicle device CN1A to the server S1 via a cellphone communication network instead of the plurality of roadside devices R1, . . . , RN (i.e., DSRC devices).

Figure 14:
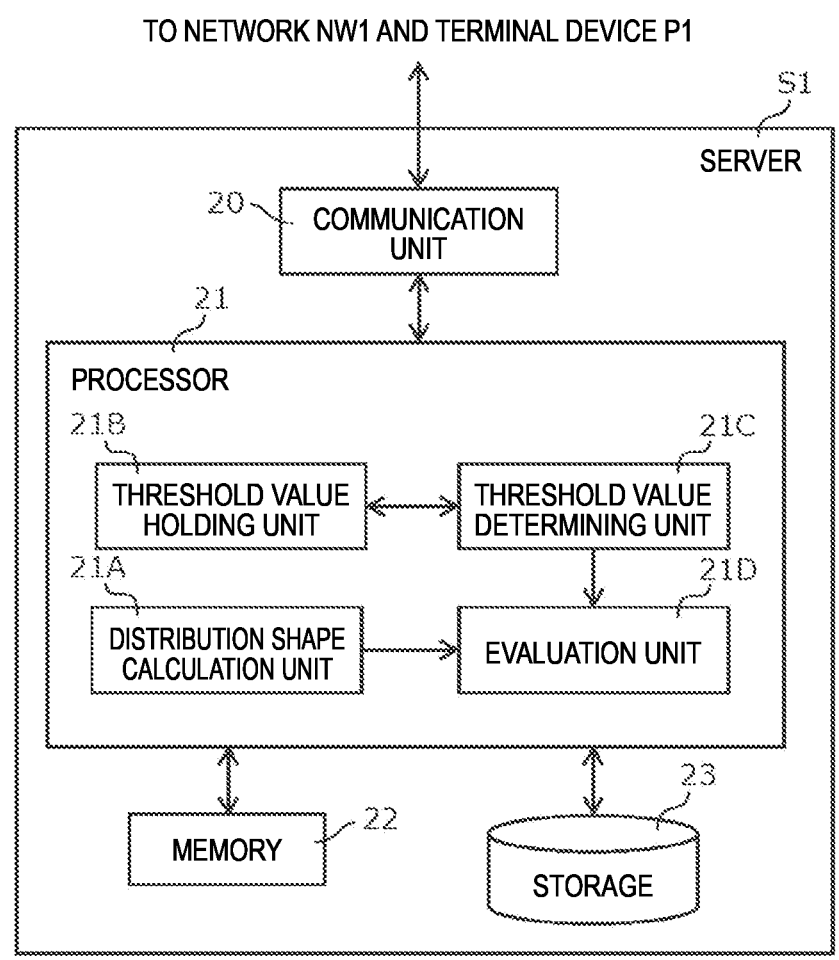
FIG. 14 is a block diagram showing an example internal configuration of a server employed in the second embodiment.

Next, an example internal configuration of the server S1 will be described with reference to FIG. 14. FIG. 14 is a block diagram showing an example internal configuration of the server S1 employed in the second embodiment. Although in FIG. 13 the server S1 is separate from the terminal device P1, they may be integrated with each other. The server S1 employed in the second embodiment, which executes steps St3-St17 of the driving evaluation process shown in FIGS. 8 and 9, evaluates the manners of driving of drivers of the vehicles on the basis of a plurality of sets of sampled pieces of sampled speed information transmitted from the in-vehicle devices CN1A, . . . , respectively.

The server S1 is configured so as to include a communication unit 20, a processor 21, a memory 22, and a storage 23. The storage 23 may be separate from the server S1.

The communication unit 20 is connected to the terminal device P1 via the network NW1 so as to be able to perform data communication with it and is also connected to each of the plurality of roadside devices R1, . . . , RN via the network NW1 so as to be able to perform data communication with it. An intermediate server or a relay serve for relaying data to be communicated may be provided between each of the plurality of roadside devices R1, . . . , RN and the server S1. The communication unit 20 outputs, to a distribution shape calculation unit 21A of the processor 21 and pieces of sampled speed information of the plurality of vehicles C1, . . . pieces of position information and pieces of identification information of the in-vehicle devices CN1A, . . . transmitted from the roadside devices R1, . . . , RN over the network NW1. Furthermore, the communication unit 20 transmits, to the terminal device P1, driving evaluation results of the drivers of the plurality of vehicles C1, . . . that are output from the processor 21.

The processor 21 is configured using, for example, a CPU or an FPGA and performs various kinds of processing and control in cooperation with the memory 22. More specifically, the processor 11 realizes functions of the respective units by referring to programs and data held by the memory 22 and running the programs. For example, the units mentioned above are the distribution shape calculation unit 21A, a threshold value holding unit 21B, a threshold value determining unit 21C, and an evaluation unit 21D. The distribution shape calculation unit 21A, the threshold value holding unit 21B, the threshold value determining unit 21C, and the evaluation unit 21D of the server S1 employed in the second embodiment executes steps corresponding to the steps, executed by the distribution shape calculation unit 11C, the threshold value holding unit 11D, the threshold value determining unit 11E, and the evaluation unit 11F, of the driving evaluation process shown in FIGS. 8 and 9 and thereby realize a driving evaluation process.

For example, the memory 22 includes a RAM as a work memory to be used while the processor 21 performs each kind of processing and a ROM that is stored with programs that prescribe how the processor 21 is to operate as well as necessary data. Data or information generated or acquired by the processor 21 is stored in the RAM temporarily. The programs for prescribe the operation of the processor 21 is stored in the ROM.

For example, the storage 23 is an HDD (hard disk drive) or an SSD (solid-state drive). Where the storage 23 is separate from the server S1, the storage 23 may be implemented as an online storage that is connected to the server S1 via the network NW1 so as to be able to perform data communication with it or as an external storage medium such as a memory card (e.g., SD card).

The processor 21 outputs one or more pieces of sampled speed information, one or more pieces of position information, and the identification information of an in-vehicle device to the storage 23. The storage 23 stores the one or more pieces of sampled speed information for each identification information of an in-vehicle device. The processor 21 may generate statistical data or correlation data (see FIG. 15) on the basis of driving evaluation results of a plurality of drivers or first output values and second output values of a plurality of drivers.

The distribution shape calculation unit 21A judges, for each set of one or more sampled pieces of speed information accumulated in the storage 23 as data corresponding to the identification information of one in-vehicle device, whether sampled and accumulated pieces of speed information corresponding to a preset second prescribed distance (e.g., 30 km or 40 km) have been accumulated on the basis of pieces of position information indicating positions where the respective sampled and accumulated pieces of speed information were acquired. If judging that sampled pieces of speed information corresponding to the second prescribed distance have been accumulated on the basis of the pieces of position information indicating positions where the respective sampled and accumulated pieces of speed information were acquired, the distribution shape calculation unit 21A calculates a difference value (speed difference value) between two pieces of speed information that are adjacent to each other in the time series (i.e., a speed indicated by speed information sampled by kth sampling and a speed indicated by speed information sampled by (k+1)th sampling) among the plurality of sampled and accumulated pieces of speed information. If speed information sampled by the kth sampling is speed information of the latest sampling, the distribution shape calculation unit 21A may calculate a speed difference value between a speed indicated by the speed information sampled by the kth sampling and a speed indicated by speed information sampled by (k−1)th sampling. In this case, k is an integer that is larger than or equal to 2. On the other hand, if judging that sampled pieces of speed information corresponding to the second prescribed distance have not been accumulated yet on the basis of the pieces of position information indicating positions where the respective sampled and accumulated pieces of speed information were acquired, the distribution shape calculation unit 21A continues the accumulation processing.

The distribution shape calculation unit 21A classifies each of a plurality of calculated difference values (data) into one of a plurality of groups of different, prescribed speed ranges (e.g., 0-5 km/h, 5-10 km/h, . . . ). The prescribed ranges of the plurality of groups are set in units of a prescribed value (e.g., 2 km/h, 3 km/h, or 5 km/h). The distribution shape calculation unit 21A determines the count of each group so that the count indicates the number of difference values (data) belonging to the group, on the basis of a result of the grouping. If the distribution shape calculation unit 21A is stored with information of the numbers of sets of difference values (data) belonging to the respective groups that were counted when grouping was done last time, the distribution shape calculation unit 21A adds the numbers of sets of difference values (data) belonging to the respective groups in the grouping of this time to the numbers of difference values (data) that were accumulated last time as belonging to the respective groups.

After counting the number of difference values (data) belonging to each group, the distribution shape calculation unit 21A judges whether difference values (data) corresponding to the preset second prescribed distance have been counted. If judging that difference values (data) corresponding to the preset second prescribed distance have been counted, the distribution shape calculation unit 21A calculates a proportion of difference values (data) belonging to each group with respect to all the difference values (data) and generates a speed variation distribution including pieces of information of proportions of sets of difference values (data) belonging to the respective groups. On the other hand, if judging that difference values (data) corresponding to the preset second prescribed distance have not been counted, the distribution shape calculation unit 21A performs processing of calculating difference values or processing of accumulating sampled pieces of speed information. The distribution shape calculation unit 21A outputs the generated speed variation distribution to the evaluation unit 21D.

A plurality of parameter values (e.g., acceleration values) to be used for calculating threshold values for evaluation of the manners of driving of the drivers of the vehicles C1, . . . are stored in the threshold value holding unit 21B. A plurality of parameter values (e.g., acceleration values) may be stored in the threshold value holding unit 21B according to parameter value selection information. Only one parameter value may be stored in the threshold value holding unit 21B.

The threshold value determining unit 21C selects at least one parameter value from the plurality of parameter values stored in the threshold value holding unit 21B according to the parameter value selection information. The threshold value determining unit 21C calculates threshold values on the basis of the respective selected parameter values and outputs the calculated parameter values to the evaluation unit 21D.

The threshold value determining unit 21C may calculate a third threshold value to be used for excluding abnormal values from the plurality of difference values to be used for generating a speed variation distribution on the basis of the selected parameter values. The threshold value determining unit 21C outputs the calculated third threshold value to the evaluation unit 21D.

The threshold value determining unit 21C may output the calculated third threshold value to the distribution shape calculation unit 21A. In this case, the distribution shape calculation unit 21A generates a speed variation distribution in which difference values having absolute values larger than or equal to the third threshold value are excluded from the difference values belonging to each group on the basis of the third threshold value that is output from the threshold value determining unit 21C and outputs the generated speed variation distribution to the evaluation unit 21D. Since the difference values having absolute values larger than or equal to the third threshold value are excluded from the difference values belonging to each group, the distribution shape calculation unit 21A may perform the processing of calculating difference values or the processing of accumulating sampled pieces of speed information if it is judged that difference values corresponding to the second prescribed distance have not been counted.

The evaluation unit 21D calculates a first output value indicating a proportion of sudden acceleration events and a second output value indicating a proportion of sudden deceleration events on the basis of the speed variation distribution that is output from the distribution shape calculation unit 21A and the threshold values that are output from the threshold value determining unit 21C. If a third threshold value is output from the threshold value determining unit 21C, the evaluation unit 21D generates a speed variation distribution by excluding abnormal values having absolute values that are larger than or equal to the third threshold value (i.e., groups of values having absolute values larger than or equal to the third threshold value). The evaluation unit 21D evaluates the manner of driving of the driver of the vehicle on the basis of the calculated first output value and second output value and outputs a driving evaluation result and the identification information of the in-vehicle device to the communication unit 20 in such a manner that they are in association with each other and stores them in the storage 23. The communication unit 20 transmits the driving evaluation result and the identification information of the in-vehicle device that are output from the evaluation unit 21D to the terminal device P1 over the network NW1 and causes the terminal device P1 to output them. The evaluation unit 21D may output not only the driving evaluation result and the identification information of the in-vehicle device but also the parameter selection information etc. to the communication unit 20 in such a manner that they are in association with each other. Furthermore, the evaluation unit 21D may calculate threshold values and evaluation reference values to be used for driving evaluation of vehicles having common parameter selection information or similar pieces of parameter selection information on the basis of the generated statistical data, correlation data etc.

Other specific items of the driving evaluation method executed by the evaluation unit 21D are similar to corresponding items executed by the evaluation unit 11F of the in-vehicle device 11F of the in-vehicle device CN1 employed in the first embodiment and hence will not be described.

Driving evaluation results generated for the respective pieces of identification information of the in-vehicle device CN1, . . . and the statistical data, correlation data, etc. generated by the evaluation unit 21D are stored in the storage 23.

Figure 15:
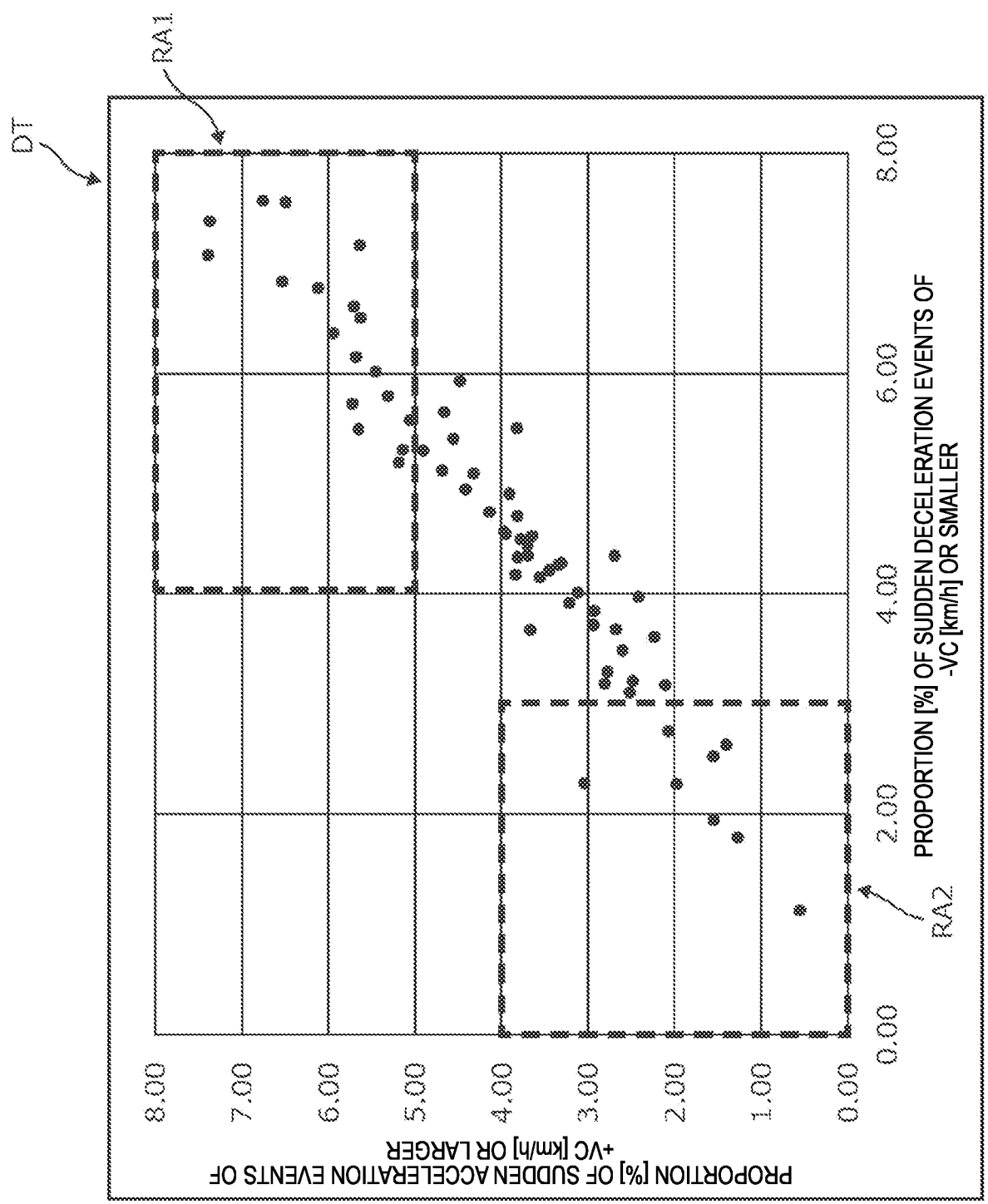
FIG. 15 is a graph showing example correlation data obtained on the basis of driving evaluation results of drivers of a plurality of vehicles.

Next, a description will be made of correlation data DT of first output values and second output values of the respective vehicles C1, . . . generated by the server S1. FIG. 15 is a graph showing example correlation data DT obtained on the basis of driving evaluation results of drivers of a plurality of vehicles.

Correlation data DT is generated by the server S1 and transmitted to the terminal device P1 over the network NW1. The correlation data DT shown in FIG. 15 is data generated by plotting first output values and second output values as driving evaluation results of the drivers of the plurality of vehicles C1, . . . and in which the vertical axis represents the proportion of a first output value (sudden acceleration events) and the horizontal axis represents the proportion of a second output value (sudden deceleration events). A region RA1 is a region where the proportion of sudden acceleration events and the proportion of sudden deceleration events are both large. A region RA2 is a region where the proportion of sudden acceleration events and the proportion of sudden deceleration events are both small. The correlation data DT may be displayed with an indication showing that the driving evaluation results (output values) contained in the region RA1 and/or the region RA2 are identifiable. As examples of the indication, the region RA1 or RA2 may be enclosed by a frame or indicated by a color different from other regions, the driving evaluation results contained in the region RA1 or RA2 may be indicated by a color different from those in other regions, etc. However, the indication is not limited thereto, and may be various forms.

By generating correlation data DT by collecting driving evaluation results of the drivers of the plurality of vehicles C1, . . . having common parameter selection information, in performing driving evaluation using prescribed parameter selection information the server S1 can derive more appropriate parameter values or threshold values and derive a more appropriate threshold value (evaluation standard value) for a first output value and a more appropriate threshold value (evaluation standard value) for a second output value as evaluation reference values of driving evaluation.

The driving evaluation device 200 according to the second embodiment has been described for a case that a speed variation distribution is generated using difference values (speed difference values) calculated on the basis of sets of pieces of speed information of the vehicles C1, . . . and the manners of driving of drivers are evaluated on the basis of the generated speed variation distribution. However, it goes without saying that another procedure is possible in which sets of acceleration values of the vehicles C1, . . . are calculated on the basis of sets of pieces of speed information of the vehicles C1, . . . , acceleration distributions are generated using the calculated sets of acceleration values, and the manners of driving of the drivers are evaluated on the basis of the generated acceleration distributions. In this case, the server S1 evaluates the manners of driving of the drivers in the same method as described in the modification of the first embodiment.

As described above, the server S1 according to the second embodiment is an information providing system which communicates with the in-vehicle devices CN1A, . . . installed in the vehicles C1, . . . via the roadside devices R1, . . . , RN (examples of roadside antenna). The information providing system acquires sets of pieces of speed information of the vehicles C1, . . . in association with pieces of identification information of the in-vehicle devices CN1A, . . . . Each of the pieces of speed information has been stored in one in-vehicle device CN1A, . . . each time the vehicle C1) moved a prescribed distance before the vehicle C1, . . . passes by one of the roadside devices R1, . . . , RN, from the in-vehicle devices CN1A, . . . via the roadside devices R1, . . . , RN. Further, the information providing system causes an information display device to display pieces of evaluation information in association with the respective pieces of identification information. Each of the pieces of evaluation information indicates a frequency of occurrence of sudden acceleration events or sudden deceleration events of the vehicles C1, . . . . The frequency of occurrence is obtained from a proportion of differences between calculation values (first and second output values or fourth and fifth output values) outside a threshold range (i.e., larger than or equal to the first threshold value VC1 or smaller than or equal to the second threshold value VC2 or larger than or equal to the fourth threshold value VC3 or smaller than or equal to the fifth threshold value VC4). The calculation values are calculated on the basis of the pieces of speed information in a prescribed period corresponding to the pieces of speed information stored in the in-vehicle device CN1A, . . . .

The term "information display device," which is an example the term "device," is a device such as an in-vehicle device CN1A, a car navigation device (not shown), a monitor (not shown), a speaker (not shown), or an HUD (head-up display) that is installed in each of the vehicles C1, . . . and connected to the roadside devices R1, . . . , RN so as to be able to perform wireless communication with them or a monitor (not shown) or a speaker (not shown) of the terminal device P1 that is connected to the server S1 so as to be able to perform data communication with it.

The above-described server S1 according to the second embodiment can evaluate driving tendencies (e.g., frequent sudden acceleration/deceleration, frequent sudden acceleration, or frequent sudden deceleration) of drivers of the vehicles C1, . . . even if pieces of sampled speed information as data indicating driving behavior of each of the vehicles C1, . . . are acquired irregularly in time.

As described above, calculation values that are calculated by the server S1 according to the second embodiment are speed difference values of each of the vehicles C1, . . . or acceleration values calculated on the basis of speed difference values. As a result, the server S1 according to the second embodiment can evaluate driving tendencies (e.g., frequent sudden acceleration/deceleration, frequent sudden acceleration, or frequent sudden deceleration) of a driver of each of the vehicles C1, . . . on the basis of speed difference values or acceleration values as index values for evaluation of a frequency of sudden acceleration events or sudden deceleration events of each of the vehicles C1, . . . .

As described above, in the server S1 according to the second embodiment, the evaluation information is such that the frequency of occurrence of sudden acceleration events or sudden deceleration events of the vehicle is high when the proportion is higher than or equal to a prescribed value. As such, when judging that the driver of the vehicle has a driving tendency that the frequency of sudden acceleration events or sudden deceleration events is high on the basis of speed difference values or acceleration values (an example of the term "index values"), the server S1 according to the second embodiment can generate a notice to the effect that the driver of the vehicle has a driving tendency that the frequency of sudden acceleration events or sudden deceleration events is high and cause an information display device to output the notice.

The above-mentioned prescribed proportion value (threshold proportion) may be a desired proportion and may be, for example, a proportion set by a user, a proportion that is determined according to a prescribed condition as in the case of the first threshold value VC1 or the second threshold value VC2, or an arbitrary proportion.

As described above, in the second embodiment, the evaluation information is a chart that is plotted using an axis representing the proportion of sudden acceleration events (e.g., the vertical axis of the correlation data DT shown in FIG. 15) and an axis representing the proportion of sudden deceleration events (e.g., the horizontal axis of the correlation data DT shown in FIG. 15) and pieces of evaluation information associated with a plurality of different pieces of identification information, respectively, are displayed as correlation data constituting the chart. As such, the server S1 according to the second embodiment can present (display), to a user who is a manager of the server S1, correlation data generated on the basis of respective driving evaluation results of drivers of the plurality of vehicles C1, . . . by displaying it on the terminal device P1. Furthermore, the server S1 or the user can set more appropriate threshold values (e.g., first threshold value VC1 and second threshold value VC2 or fourth threshold value VC3 and fifth threshold value VC4) to be used in each of the plurality of vehicles C1, . . . traveling on roads having a common parameter selection information (position information, date/time information, or the like)

As described above, the server S1 according to the second embodiment acquires position information or date/time information indicating a position where or a time when the pieces of speed information were acquired and selects at least one acceleration value for calculating the threshold value (i.e., first threshold value VC1 or second threshold value VC2, or fourth threshold value VC3 or fifth threshold value VC4) on the basis of the acquired position information or date/time information. As such, the server S1 according to the second embodiment can select parameter values to be used for driving evaluation and calculate various threshold values (i.e., first threshold value VC1 and second threshold value VC2 or fourth threshold value VC3 and fifth threshold value VC4) on the basis of the parameter selection information indicating a position where and/or a time when the vehicles C1, . . . are traveling. Thus, the server S1 can evaluate driving tendencies of the drivers in a more appropriate manner. For example, if the position information indicating a position where the vehicles C1, . . . are traveling indicates a high latitude and the season and the time indicated by the date/time information are winter and night, the in-vehicle device CN1, . . . or the server S1 can evaluate the manners of driving of the drivers in a more appropriate manner by setting the parameter values (i.e., acceleration values) to be selected smaller than in a case that the position information indicates a low latitude and the date/time information indicates daytime.

As described above, the server S1 according to the second embodiment acquires position information and/or date/time information indicating a position where and/or a time when the pieces of speed information were acquired. The threshold value (i.e., first threshold value VC1 or second threshold value VC2, or fourth threshold value VC3 or fifth threshold value VC4) is set on the basis of sets of calculation values of a plurality of different vehicles having the position information and/or the date/time information in common. As such, the server S1 according to the second embodiment can increase the accuracy of driving evaluation to be performed on each of the drivers of the plurality of vehicles C1, . . . by setting more appropriate threshold values (i.e., first threshold value VC1 and second threshold value VC2 or fourth threshold value VC3 and fifth threshold value VC4).

As described above, the server S1 according to the second embodiment excludes, as abnormal values, calculation values having absolute values that are larger than or equal to a third threshold value (an example of the term "prescribed value"). As such, even in a case that acquired pieces of speed information are erroneous because of deviations of satellite positioning signals due to propagation delays of radio waves transmitted from artificial satellites, an improper arrangement of satellites, a multipath problems, or the like, the server S1 according to the second embodiment can generate a speed change distribution or an acceleration distribution in which abnormal difference values (data) calculated using such erroneous pieces of speed information.

As described above, in the first embodiment, the modification of the first embodiment, and the second embodiment, the pieces of speed information are acquired through sampling by detecting that each of the vehicles C1, . . . has moved the prescribed distance each time on the basis of satellite positioning signals acquired from artificial satellites. As such, the server S1 according to the second embodiment can evaluate driving tendencies (e.g., frequent sudden acceleration/deceleration, frequent sudden acceleration, or frequent sudden deceleration) of the drivers of the vehicles C1, . . . even if sampled pieces of speed information are acquired in a temporally irregular manner.

As described above, each of the in-vehicle devices CN1A, . . . according to the second embodiment is an information providing system which is installed in the corresponding one of the vehicles C1, . . . and performs a communication via the roadside devices R1, . . . , RN (examples of roadside antennas). The information providing system is connected to devices installed in the respective vehicles C1, . . . via the network NW1. The information providing system acquires sets of pieces of speed information of the vehicles C1, . . . in association with identification information of the respective in-vehicle devices CN1A, . . . from the in-vehicle devices CN1A, . . . via the roadside devices R1, . . . , RN. Each of the pieces of speed information stored in the in-vehicle device CN1A, . . . each time the vehicle C1, . . . moves a prescribed distance before the vehicle C1, . . . passes by the roadside devices R1, . . . , RN. Further, the information providing system transmits pieces of evaluation information to the device via the network to cause the device to output the pieces of evaluation information. The pieces of evaluation information indicate a frequency of occurrence of sudden acceleration events or sudden deceleration events of the respective vehicles C1, . . . . The frequency of occurrence is obtained from a proportion of differences between calculation values (first and second output values or fourth and fifth output values) outside a threshold range (i.e., larger than or equal to the first threshold value VC1 or smaller than or equal to the second threshold value VC2 or larger than or equal to the fourth threshold vale VC3 or smaller than or equal to the fifth threshold vale VC4). The calculation values are calculated on the basis of the pieces of speed information in a prescribed period corresponding to the pieces of speed information stored in the in-vehicle device.

As described above, the server S1 according to the second embodiment is an information providing system which communicates with the in-vehicle devices CN1A, . . . installed in the vehicles C1, . . . via roadside devices R1, . . . , RN (examples of roadside antennas). The information providing system is equipped with one or more processing devices (e.g., processor 21) and a recording device (memory 22 or storage 23) which records information that allows the one or more processing devices to operate. The information providing system causes an information display device to display, in such a manner that they are associated with pieces of identification information of the in-vehicle devices, pieces of evaluation information each of which indicates a frequency of occurrence of sudden acceleration or sudden deceleration of one of the vehicles C1, . . . that is obtained from a proportion of calculation values (first and second output values or fourth and fifth output values) having differences having absolute values larger than or equal to a threshold value (i.e., larger than or equal to the first threshold value VC1 or the second threshold value VC2) among calculation values calculated on the basis of the pieces of speed information in a prescribed period corresponding to pieces of speed information of the vehicle C1, . . . each of which was stored in the in-vehicle device CN1A, . . . ) each time the vehicle C1, . . . moved a prescribed distance before the vehicle C1, . . . passes by one of the roadside devices R1, . . . , RN and that were accumulated in such a manner that the pieces of speed information are associated with the identification information of the in-vehicle device CN1A, . . . .

The disclosure makes it possible to evaluate a driving tendency of a driver of a vehicle even if pieces of data indicating driving behavior of the vehicle are acquired in a temporally irregular manner.

Although the various embodiments have been described above with reference to the accompanying drawings, the concept of the disclosure is not restricted to those examples. It is apparent that those skilled in the art could conceive various changes, modifications, replacements, additions, deletions, equivalents, etc. within the confines of the claims, and it is understood that they belong to the technical scope of the disclosure. Constituent elements of the various embodiments may be combined in a desired manner without departing the spirit and scope of the invention.

The present disclosure is useful in providing an information providing method and an information providing system capable of evaluating a driving tendency of a driver of a vehicle even if pieces of data indicating driving behavior of the vehicle are acquired in a temporally irregular manner.

This application is based on and claims the benefit of priority of Japanese Patent Application No. 2020-133362 filed on Aug. 5, 2020 and Japanese Patent Application No. 2021-082715 filed on May 14, 2021, the entire contents of which are incorporated herein by reference.

The invention claimed is:

1. An information providing method in an information providing system configured to communicate with an in-vehicle device installed in a vehicle via roadside antennas, the information providing method comprising:
    acquiring pieces of speed information of the vehicle in association with identification information of the in-vehicle device from the in-vehicle device via the roadside antennas, each of the pieces of speed information having been stored in the in-vehicle device each time the vehicle moves a prescribed distance before the vehicle passes by the roadside antennas; and
    causing an information display device to display evaluation information in association with the identification information, the evaluation information indicating a frequency of occurrence of sudden acceleration events or sudden deceleration events of the vehicle, the frequency of occurrence being obtained from a proportion of differences between calculation values outside a threshold range, the calculation values being calculated on a basis of the pieces of speed information in a prescribed period corresponding to the pieces of speed information stored in the in-vehicle device, the evaluation information indicating that a driver of the vehicle has a tendency of the sudden acceleration events or the sudden deceleration events when the proportion is higher than or equal to a prescribed value,
    wherein the in-vehicle device transmits the pieces of speed information of the vehicle and the identification information of the in-vehicle device to the roadside antennas, whereupon the information providing system acquires the pieces of speed information of the vehicle and the identification information of the in-vehicle device from the roadside antennas.

2. The information providing method according to claim 1,
    wherein the calculation values are speed differences of the vehicle or acceleration values calculated on a basis of the speed differences of the vehicle.

3. The information providing method according to claim 2,
    wherein the speed differences or the acceleration values are calculated on a basis of differences between adjacent pieces of speed information in a time series.

4. The information providing method according to claim 1,
    wherein the frequency of occurrence of sudden acceleration events or sudden deceleration events is determined to be high if the proportion is higher than or equal to a threshold proportion.

5. The information providing method according to claim 1,
    wherein the evaluation information is plotted on a chart having an axis representing a proportion of sudden acceleration events and an axis representing a proportion of sudden deceleration events, and
    wherein the causing the information display device to display the evaluation information comprises displaying pieces of evaluation information in association with a plurality of different pieces of identification information, respectively, as correlation data constituting the chart.

6. The information providing method according to claim 5,
    wherein the correlation data is displayed on the information display device with an indication showing that the pieces of evaluation information contained in a first region are identifiable, the first region being where the proportion of sudden acceleration events and the proportion of sudden deceleration events are both large.

7. The information providing method according to claim 5,
    wherein the correlation data is displayed on the information display device with an indication showing that the pieces of evaluation information contained in a second region are identifiable, the second region being where the proportion of sudden acceleration events and the proportion of sudden deceleration events are equal to or smaller than respective thresholds.

8. The information providing method according to claim 1, further comprising:
    acquiring position information or date and time information at a time of acquisition of the pieces of speed information; and
    selecting at least one acceleration value for calculating the threshold range on a basis of the position information or the date and time information.

9. The information providing method according to claim 1, further comprising:
    acquiring position information or date and time information at a time of acquisition of the pieces of speed information; and
    setting the threshold range on a basis of sets of the calculation values relating to respective different vehicles having the position information or the date and time information in common.

10. The information providing method according to claim 1,
    wherein at least part of the calculation values outside a prescribed range are excluded as abnormal values.

11. The information providing method according to claim 1,
    wherein the pieces of speed information are accumulated in the in-vehicle device through sampling by detection of the vehicle moving the prescribed distance each time on a basis of satellite positioning signals acquired from artificial satellites.

12. An information providing system configured to communicate with an in-vehicle device installed in a vehicle via roadside antennas and communicate with a device installed in the vehicle via a network, and configured to store, in a storage, pieces of speed information of the vehicle in association with identification information of the in-vehicle device received from the in-vehicle device via the roadside antennas, each of the pieces of speed information having been stored in the in-vehicle device each time the vehicle moves a prescribed distance before the vehicle passes by the roadside antennas, the information providing system comprising:

one or more processors; and
one or more memories having instructions, when executed by the one or more processors, to cause the information providing system to perform operations, the operations comprising:
retrieving the pieces of speed information of the vehicle in association with the identification information from the storage; and
transmitting evaluation information to the device via the network to cause the device to display the evaluation information, the evaluation information indicating a frequency of occurrence of sudden acceleration events or sudden deceleration events of the vehicle, the frequency of occurrence being obtained from a proportion of differences between calculation values outside a threshold range, the calculation values being calculated on a basis of the pieces of speed information in a prescribed period corresponding to the pieces of speed information stored in the in-vehicle device, the evaluation information indicating that a driver of the vehicle has a tendency of the sudden acceleration events or the sudden deceleration events when the proportion is higher than or equal to a prescribed value,
wherein the in-vehicle device transmits the pieces of speed information of the vehicle and the identification information of the in-vehicle device to the roadside antennas, whereupon the information providing system acquires the pieces of speed information of the vehicle and the identification information of the in-vehicle device from the roadside antennas.

13. An information providing system configured to communicate with an in-vehicle device installed in a vehicle via roadside antennas and store, in a storage, pieces of speed information of the vehicle in association with identification information of the in-vehicle device from the in-vehicle device via the roadside antennas, each of the pieces of speed information having been stored in the in-vehicle device each time the vehicle moves a prescribed distance before the vehicle passes by the roadside antennas, the information providing system comprising:

one or more processors; and
one or more memories having instructions, when executed by the one or more processors, to cause the information providing system to perform operations, the operations comprising:
retrieving the pieces of speed information of the vehicle in association with the identification information of the in-vehicle device from the storage; and
causing an information display device to display evaluation information in association with the identification information, the evaluation information indicating a frequency of occurrence of sudden acceleration events or sudden deceleration events of the vehicle, the frequency of occurrence being obtained from a proportion of differences between calculation values outside a threshold range, the calculation values being calculated on a basis of the pieces of speed information in a prescribed period corresponding to the pieces of speed information stored in the in-vehicle device, the evaluation information indicating that a driver of the vehicle has a tendency of the sudden acceleration events or the sudden deceleration events when the proportion is higher than or equal to a prescribed value,
wherein the in-vehicle device transmits the pieces of speed information of the vehicle and the identification information of the in-vehicle device to the roadside antennas, whereupon the information providing system acquires the pieces of speed information of the vehicle and the identification information of the in-vehicle device from the roadside antennas.

* * * * *